US012679908B2

(12) United States Patent
Baillie et al.

(10) Patent No.: US 12,679,908 B2

(45) Date of Patent: Jul. 14, 2026

(54) CATALYST SYSTEMS AND PROCESSES FOR PRODUCING POLYETHYLENE USING THE SAME

(71) Applicant: Dow Global Technologies LLC, Midland, MI (US)

(72) Inventors: Rhett A. Baillie, Lake Jackson, TX (US); Johnathan E. Delorbe, Lake Jackson, TX (US); Andrew M. Camelio, Midland, MI (US); Hien Q Do, Lake Jackson, TX (US); Philip P. Fontaine, Lake Jackson, TX (US); David M. Pearson, Lake Jackson, TX (US); Mari S. Rosen, Lake Jackson, TX (US); Brad C. Bailey, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 783 days.

(21) Appl. No.: 18/000,033

(22) PCT Filed: May 28, 2021

(86) PCT No.: PCT/US2021/034878

§ 371 (c)(1),
(2) Date: Nov. 28, 2022

(87) PCT Pub. No.: WO2021/243222

PCT Pub. Date: Dec. 2, 2021

(65) Prior Publication Data

US 2023/0250202 A1 Aug. 10, 2023

Related U.S. Application Data

(60) Provisional application No. 63/143,333, filed on Jan. 29, 2021, provisional application No. 63/031,638, filed on May 29, 2020.

(51) Int. Cl.
*C08F 10/02* (2006.01)
*C08F 2/01* (2006.01)
(Continued)

(52) U.S. Cl.
CPC ................ *C08F 10/02* (2013.01); *C08F 2/01* (2013.01); *C08F 2/34* (2013.01); *C08F 4/02* (2013.01);
(Continued)

(58) Field of Classification Search
None
See application file for complete search history.

(56) References Cited

U.S. PATENT DOCUMENTS 3,709,853 A 1/1973 Karapinka
4,003,712 A 1/1977 Miller
(Continued)

FOREIGN PATENT DOCUMENTS

CN 109476783 A 3/2019
CN 110461890 A 11/2019
(Continued)

OTHER PUBLICATIONS

Chinese Office Action dated Jan. 17, 2024, pertaining to CN Patent Application No. 2021800380954, 14 pgs.
(Continued)

*Primary Examiner* — Catherine S Branch

(74) *Attorney, Agent, or Firm* — Dinsmore & Shohl LLP

(57) ABSTRACT

Embodiments of the present application are directed to procatalysts, and catalyst systems including procatalysts, including a metal-ligand complex having the structure of formula (I):

20 Claims, 8 Drawing Sheets

(51) Int. Cl.
*C08F 2/34* (2006.01)
*C08F 4/02* (2006.01)
*C08F 4/64* (2006.01)
*C08F 4/659* (2006.01)
*C08F 210/16* (2006.01)

(52) U.S. Cl.
CPC ...... *C08F 4/64193* (2013.01); *C08F 4/65912* (2013.01); *C08F 4/65916* (2013.01); *C08F 210/16* (2013.01)

(56) References Cited

U.S. PATENT DOCUMENTS

| | | | |
|---|---|---|---|
| 4,011,382 | A | 3/1977 | Levine et al. |
| 4,302,566 | A | 11/1981 | Karol et al. |
| 4,543,399 | A | 9/1985 | Jenkins, III et al. |
| 4,665,208 | A | 5/1987 | Welborn, Jr. et al. |
| 4,874,734 | A | 10/1989 | Kioka et al. |
| 4,882,400 | A | 11/1989 | Dumain et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,968,827 | A | 11/1990 | Davis |
| 5,041,584 | A | 8/1991 | Crapo et al. |
| 5,091,352 | A | 2/1992 | Kioka et al. |
| 5,103,031 | A | 4/1992 | Smith, Jr. |
| 5,157,137 | A | 10/1992 | Sangokoya |
| 5,204,419 | A | 4/1993 | Tsutsui et al. |
| 5,206,199 | A | 4/1993 | Kioka et al. |
| 5,235,081 | A | 8/1993 | Sangokoya |
| 5,248,801 | A | 9/1993 | Sangokoya |
| 5,329,032 | A | 7/1994 | Tran et al. |
| 5,352,749 | A | 10/1994 | DeChellis et al. |
| 5,541,270 | A | 7/1996 | Chinh et al. |
| 5,665,818 | A | 9/1997 | Tilston et al. |
| 5,677,375 | A | 10/1997 | Rifi et al. |
| 5,965,477 | A | 10/1999 | Sivaram et al. |
| 5,972,510 | A | 10/1999 | O'Hare et al. |
| 6,034,187 | A | 3/2000 | Maehama et al. |
| 6,472,484 | B1 | 10/2002 | Abe et al. |
| 6,753,390 | B2 | 6/2004 | Ehrman et al. |
| 9,029,487 | B2 | 5/2015 | Klosin et al. |
| 9,234,060 | B2 | 1/2016 | Kao et al. |
| 9,527,941 | B2 | 12/2016 | Demirors et al. |
| 2008/0071046 | A1 | 3/2008 | Leclerc et al. |
| 2015/0166699 | A1 | 6/2015 | Kao et al. |
| 2016/0340454 | A1 | 11/2016 | Funk et al. |
| 2017/0008444 | A1 | 1/2017 | Bopp et al. |
| 2020/0247917 | A1 | 8/2020 | Do et al. |
| 2021/0070902 | A1 | 3/2021 | Liu et al. |
| 2021/0261703 | A1 | 8/2021 | Liu et al. |
| 2021/0380737 | A1 | 12/2021 | Mure et al. |
| 2023/0250202 | A1 | 8/2023 | Baillie et al. |
| 2023/0287159 | A1 | 9/2023 | Baillie et al. |
| 2025/0034292 | A1 | 1/2025 | Camelio et al. |

FOREIGN PATENT DOCUMENTS

| | | | |
|---|---|---|---|
| CN | 110691797 | A | 1/2020 |
| EP | 0279586 | B1 | 5/1994 |
| EP | 0517868 | B1 | 11/1995 |
| EP | 0516476 | B1 | 10/1997 |
| EP | 0511665 | B1 | 7/1998 |
| EP | 0594218 | B1 | 3/1999 |
| EP | 0767184 | B1 | 8/1999 |
| EP | 0561476 | B1 | 9/1999 |
| EP | 0802202 | B1 | 10/1999 |
| EP | 0794200 | B1 | 7/2000 |
| EP | 1323746 | B1 | 2/2009 |
| WO | 1994010180 | A1 | 5/1994 |
| WO | 1994047598 | A1 | 9/1999 |
| WO | 1999048605 | A1 | 9/1999 |
| WO | 1999050311 | A1 | 10/1999 |
| WO | 199958582 | A1 | 11/1999 |
| WO | 1999060033 | A1 | 11/1999 |
| WO | 2008033197 | A2 | 3/2008 |
| WO | 2009064404 | A2 | 5/2009 |
| WO | 2011146044 | A1 | 11/2011 |
| WO | 2014105411 | A1 | 7/2014 |
| WO | 2014105412 | A1 | 7/2014 |
| WO | 2014105413 | A1 | 7/2014 |
| WO | 2016003879 | A1 | 1/2016 |
| WO | 2016089935 | A1 | 9/2016 |
| WO | 2018022975 | A1 | 2/2018 |
| WO | 2018183056 | A1 | 10/2018 |
| WO | 2012027448 | A1 | 1/2021 |

OTHER PUBLICATIONS

Chinese Office Action dated Sep. 30, 2024, pertaining to CN Patent Application No. 2021800377171, 16 pgs.
Chinese Office Action dated Oct. 14, 2024, pertaining to CN Patent Application No. 2021800379209, 8 pgs.
Brazilian Technical Report dated Feb. 25, 2025, pertaining to BR Patent Application No. BR112022023862.2, 8 pgs.
Brazilian Technical Report dated Feb. 25, 2025, pertaining to BR Patent Application No. BR112022023905.0, 8 pgs.
Brazilian Technical Report dated Feb. 25, 2025, pertaining to BR Patent Application No. BR112022023884.3, 8 pgs.
Brazilian Technical Report dated Feb. 28, 2025, pertaining to BR Patent Application No. BR112022023873.8, 8 pgs.
Brazilian Technical Report dated Feb. 25, 2025, pertaining to BR Patent Application No. BR112022024087.2, 8 pgs.
US Notice of Allowance dated Jun. 10, 2025, pertaining to U.S. Appl. No. 18/000,038, 10 pgs.
Japanese Notice of Refusal dated Jul. 1, 2025, pertaining to JP Patent Application No. 2022-567508, 12 pgs.
Japanese Notice of Refusal dated Jul. 1, 2025, pertaining to JP Patent Application No. 2022-567500, 5 pgs.
US Non-Final Office Action dated Jul. 9, 2025, pertaining to U.S. Appl. No. 17/999,783, 11 pgs.
Japanese Notice of Refusal dated Jul. 8, 2025, pertaining to JP Patent Application No. 2022-567737, 8 pgs.
Singapore Office Action dated Jul. 17, 2025, pertaining to SG Patent Application No. 11202260508U, 9 pgs.
Singapore Office Action dated Jul. 17, 2025, pertaining to SG Patent Application No. 11202260536T, 10 pgs.
Singapore Office Action dated Jul. 17, 2025, pertaining to SG Patent Application No. 11202260283Y, 8 pgs.
Singapore Office Action dated Jul. 17, 2025, pertaining to SG Patent Application No. 11202260510S, 8 pgs.
Singapore Office Action dated Jul. 17, 2025, pertaining to SG Patent Application No. 11202260513T, 8 pgs.
Saudi Arabia Examination Report dated Oct. 9, 2023, pertaining to SA Patent Application No. 522441492, 15 pgs.
Saudi Arabia Substantive Examination Report dated Oct. 11, 2023, pertaining to SA Patent Application No. 522441511, 15 pgs.
Chinese Office Action dated Apr. 25, 2024, pertaining to CN Patent Application No. 202180037607.5, 16 pgs.
European Article 94(3) dated Jun. 5, 2024, pertaining to EP Patent Application No. 21735492.7, 5 pgs.
European Article 94(3) dated Jun. 5, 2024, pertaining to EP Patent Application No. 21735490.1, 6 pgs.
European Article 94(3) dated Jun. 5, 2024, pertaining to EP Patent Application No. 21742208.8, 5 pgs.
European Article 94(3) dated Jun. 5, 2024, pertaining to EP Patent Application No. 21735493.5, 5 pgs.
US Non-Final Office Action dated Aug. 25, 2025, pertaining to U.S. Appl. No. 18/000,036, 20 pgs.
Chinese Office Action and Search Report dated Jan. 25, 2024, pertaining to CN Patent Application No. 202180037924.7, 17 pgs.
Chinese Office Action and Search Report dated Mar. 4, 2024, pertaining to CN Patent Application No. 202180037920.9, 20 pgs.
Chinese Office Action and Search Report dated Mar. 13, 2024, pertaining to CN Patent Application No. 202180037717.1, 16 pgs.
Chinese Office Action dated Jul. 24, 2024, pertaining to CN Patent Application No. 202180037924.7, 18 pgs.

(56) References Cited

OTHER PUBLICATIONS

Chinese Office Action dated Dec. 31, 2024, pertaining to CN Patent Application No. 202180037717.1, 6 pgs.
International Search Report and Written Opinion dated Sep. 30, 2021, pertaining to Int'l Patent Application No. PCT/US2021/034866, 8 pgs.
International Search Report and Written Opinion dated Sep. 30, 2021, pertaining to Int'l Patent Application No. PCT/US2021/034878, 9 pgs.
International Search Report and Written Opinion dated Sep. 30, 2021, pertaining to Int'l Patent Application No. PCT/US2021/034868, 10 pgs.
International Search Report and Written Opinion dated Sep. 30, 2021, pertaining to Int'l Patent Application No. PCT/US2021/034864, 13 pgs.
International Search Report and Written Opinion dated Sep. 30, 2021, pertaining to Int'l Patent Application No. PCT/US2021/034871, 13 pgs.
Lee et al. "Toward Absolute Chemical Composition Distribution Measurement of Polyolefins by High-Temperature Liquid Chromatography Hyphenated with Infrared Absorbance and Light Scattering Detectors", Analytical Chemistry 2014 86 (17), 8649-8656.
Chinese Office Action dated Jan. 13, 2025, pertaining to CN Patent Application No. 202180037924.7, 20 pgs.
India First Examination Report dated Dec. 4, 2025, pertaining to IN Patent Application No. 202217068189, 6 pgs.
US Non-Final Office Action dated Dec. 23, 2025, pertaining to U.S. Appl. No. 17/999,781, 9 pgs.
Aerosil Fumed Silica Product Overview, Evonik Power to Create, 2019, 20 pgs.
Japanese Office Action dated Jan. 6, 2026, pertaining to JP Patent Application No. 2022-567508, 4 pgs.
Korean Office Action dated Jan. 16, 2026, pertaining to KR Patent Application No. 10-2022-7044846, 9 pgs.
Korean Office Action dated Jan. 16, 2026, pertaining to KR Patent Application No. 10-2022-7044847, 11 pgs.
Korean Office Action dated Jan. 19, 2026, pertaining to KR Patent Application No. 10-2022-7044849, 8 pgs.
India Examination Report dated Jan. 19, 2026 pertaining to IN Patent Application No. 202217068052, 7 pgs.
India Examination Report dated Jan. 27, 2026 pertaining to IN Patent Application No. 202217068053, 7 pgs.
Japanese Notice of Reasons for Refusal dated Feb. 3, 2026, pertaining to JP Patent Application No. 2022-567500, 4 pgs.
Communication pursuant to Article 94(3) EPC dated Feb. 25, 2026, pertaining to EP Patent Application No. 21735490.1, 5 pgs.
Communication pursuant to Article 94(3) EPC dated Feb. 25, 2026, pertaining to EP Patent Application No. 21735492.7, 5 pgs.
Communication pursuant to Article 94(3) EPC dated Feb. 26, 2026, pertaining to EP Patent Application No. 21735493.5, 4 pgs.
Canadian Office Action dated Apr. 23, 2026, pertaining to CA Patent Application No. 3180282, 4 pgs.
Canadian Office Action dated Apr. 1, 2026, pertaining to CA Patent Application No. 3180275, 5 pgs.
Communication pursuant to Article 94(3) EPC dated Apr. 9, 2026, pertaining to EP Patent Application No. 24202827.2, 5 pgs.
Communication pursuant to Article 94(3) EPC dated Apr. 9, 2026, pertaining to EP Patent Application No. 24203285.2, 5 pgs.
Canadian Office Action dated Apr. 2, 2026, pertaining to CA Patent Application No. 3180273, 5 pgs.
Canadian Office Action dated Apr. 9, 2026, pertaining to CA Patent Application No. 3180279, 4 pgs.
Canadian Office Action dated Apr. 16, 2026, pertaining to CA Patent Application No. 3180280, 5 pgs.
US Notice of Allowance dated Mar. 11, 2026, pertaining to U.S. Appl. No. 18/000,036, 8 pgs.

CATALYST SYSTEMS AND PROCESSES FOR PRODUCING POLYETHYLENE USING THE SAME

CROSS REFERENCE TO RELATED APPLICATIONS

This application is a National Phase Entry under 35 U.S.C. § 371 of International Patent Application No. PCT/US2021/034878 filed May 28, 2021, which claims priority to U.S. Provisional Patent Application No. 63/031,638 filed May 29, 2020, and U.S. Provisional Patent Application No. 63/143,333 filed Jan. 29, 2021, which are incorporated by reference in their entirety.

TECHNICAL FIELD

Embodiments of the present disclosure are generally directed to processes for producing polyethylene and, in particular, contacting ethylene and, optionally, one or more $(C_3-C_{12})\alpha$-olefin comonomers with germanium-bridged bis-phenylphenoxy catalyst systems in a gas-phase polymerization reactor.

BACKGROUND

Since the discovery of Ziegler and Natta on heterogeneous olefin polymerizations, global polyolefin production reached approximately 150 million tons per year in 2015, and continues to increase due to market demand. The catalyst systems in the polyolefin polymerization process may contribute to the characteristics and properties of such polyolefins. For example, catalyst systems that include bis-phenylphenoxy (BPP) metal-ligand complexes may produce polyolefins that have flat or reverse short-chain branching distributions (SCBD), relatively high levels of comonomer incorporation, high native molecular weights, and/or narrow-medium molecular weight distributions (MWD).

However, when utilized in some polymerization processes, such as gas-phase polymerization, catalyst systems that include BPP metal-ligand complexes typically exhibit: 1) operability issues associated with rapid light-off; and/or 2) poor productivity. In other terms, catalyst systems that include BPP metal-ligand complexes may generally result in reactor fouling and/or produce less polymer relative to the amount of the catalyst system used. As a result, the use of catalyst systems that include BPP metal-ligand complexes may not be commercially viable in gas-phase polymerization processes.

SUMMARY

Accordingly, ongoing needs exist for catalyst systems suitable for use in gas-phase reactors that have improved light-off and/or productivity characteristics when utilized in gas-phase polymerization processes. Embodiments of the present disclosure address these needs by providing catalyst systems including BPP metal-ligand complexes having germanium-containing bridges. The catalyst systems, when utilized in gas-phase polymerization processes, exhibit improved light-off and productivity characteristics when compared to similar catalyst systems including bis-phenylphenoxy metal-ligand complexes without germanium-containing bridges.

Embodiments of the present disclosure include processes for producing polyethylene. The process comprising contacting ethylene and, optionally, one or more $(C_3-C_{12})\alpha$-olefin comonomers with a catalyst system in a gas-phase polymerization reactor at a reactor temperature of 70° C. to less than or equal to 150° C. with an ethylene partial pressure greater than or equal to 150 psi, and a molar feed ratio of less than or equal to 0.030 of one or more $(C_3-C_{12})$ $\alpha$-olefin comonomers to ethylene, wherein the catalyst system comprises an activated metal-ligand complex disposed on one or more support materials. The metal-ligand complex has a structure according to formula (Ia):

(Ia)

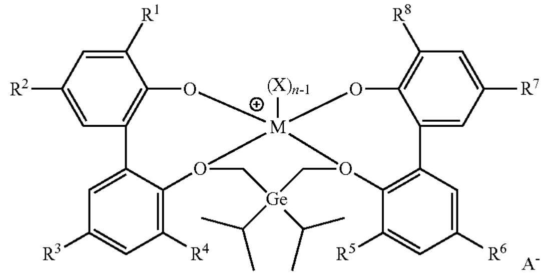

In formula (Ia), $A^-$ is an anion; M is titanium, zirconium, or hafnium; and n is 1, 2, or 3. Each X is a monodentate ligand independently selected from a group consisting of $(C_1-C_{50})$hydrocarbyl, $(C_1-C_{50})$heterohydrocarbyl, $(C_6-C_{50})$aryl, $(C_4-C_{50})$heteroaryl, and halogen;

In formula (Ia), $R^1$ and $R^8$ are independently selected from a group consisting of radicals having formula (II), and radicals having formula (III):

(II)

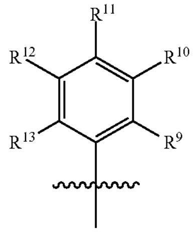

(III)

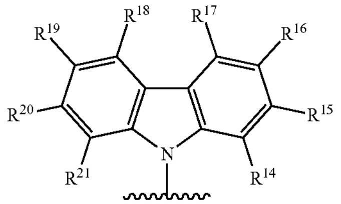

In formula (II), $R^{9-13}$ are independently chosen from —H, $(C_1-C_{50})$hydrocarbyl, $(C_1-C_{50})$heterohydrocarbyl, $—Si(R^C)_3$, $—Ge(R^C)_3$, $P(R^P)_2$, $—N(R^N)_2$, $—OR^C$, $—SR^C$, or halogen. In formula (III), $R^{14-21}$ are independently chosen from —H, $(C_1-C_{50})$hydrocarbyl, $(C_1-C_{50})$heterohydrocarbyl, $—Si(R^C)_3$, $—Ge(R^C)_3$, $—P(R^P)_2—N(R^N)_2$, $—OR^C$, $—SR^C$ or halogen.

In formula (Ia), $R^2$, $R^3$, $R^4$, $R^5$, $R^6$, and $R^7$ are independently chosen from —H, $(C_1-C_{50})$hydrocarbyl, $(C_1-C_{50})$heterohydrocarbyl, $—Si(R^C)_3$, $—Ge(R^C)_3$, $—P(R^P)_2$, $—N(R^N)_2$, $—OR^C$, $—SR^C$, and halogen.

The process of this disclosure includes an amount of ethylene consumed during the first 5 minutes upon injection of the catalyst system into the gas-phase polymerization reactor is less than 25% of the total ethylene consumed for the time of the entirety of the average residence time, $t_R$, upon initial addition of the catalyst system, wherein the time at which 25% of the total ethylene uptake ($t_{25\%}$) is calculated by the equation according to formula (IV):

$$\frac{\sum_{t=0}^{t_{25\%}} C2(t)}{\sum_{t=0}^{t_R} C2(t)} = 0.25, \text{ and } t_{25\%} > 5 \text{ min.} \quad \text{(IV)}$$

These and additional features provided by the embodiments of the present disclosure will be more fully understood in view of the following detailed description.

DETAILED DESCRIPTION

Figure 1:
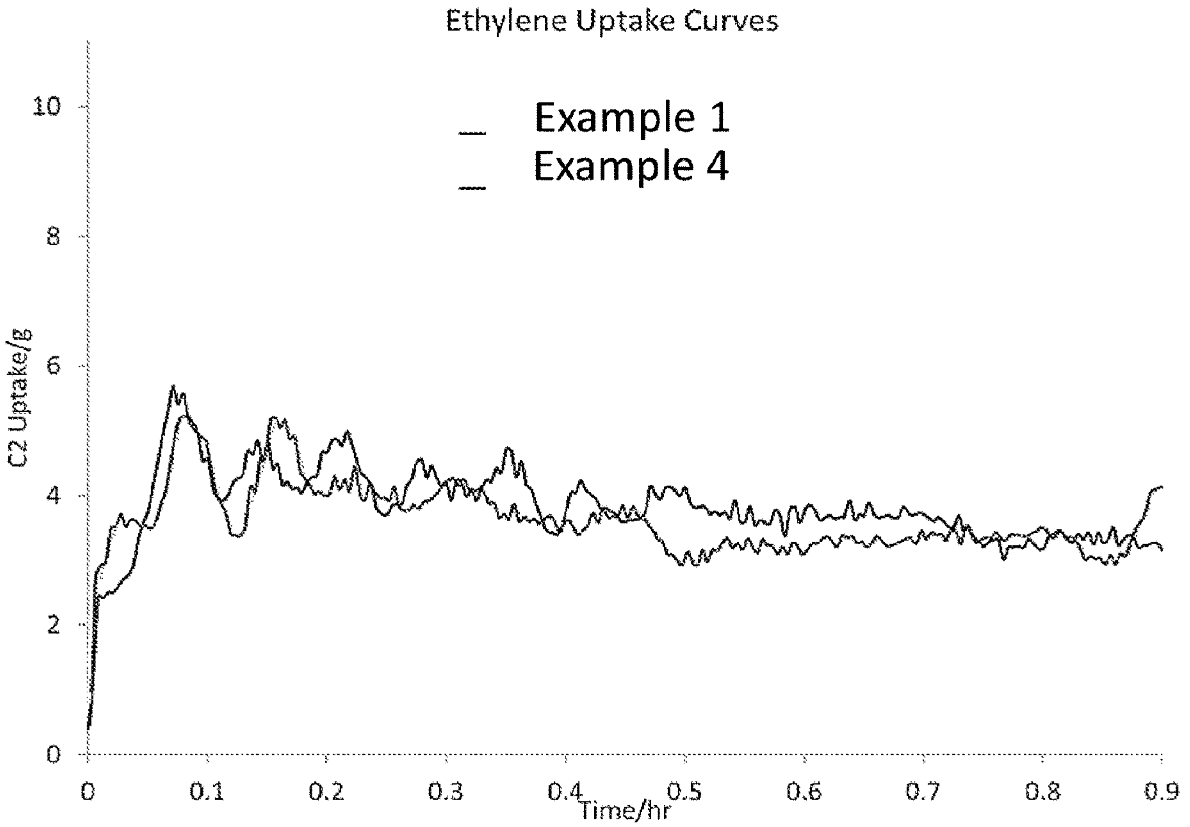
FIG. 1 is an ethylene uptake curve for Examples 4 and 7 from Table 1.

Specific embodiments of procatalysts, catalyst systems, methods of producing catalyst systems, and processes for producing polyethylene will now be described. However, it should be understood that the systems, methods, and processes of the present disclosure may be embodied in different forms, and should not be construed as limited to the specific embodiments set forth in the present disclosure. Rather, embodiments are provided so that the present disclosure will be thorough and complete, and will fully convey the scope of the disclosed subject matter to those skilled in the art.

Common abbreviations used in the present disclosure are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-d6; $CDCl_3$: deuterated chloroform; $Na_2SO_4$: sodium sulfate; $MgSO_4$: magnesium sulfate; HCL: hydrogen chloride; n-BuLi: butyllithium; t-BuLi: tert-butyllithium; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days.

The terms “halogen atom” or “halogen” mean the radical of a fluorine atom (F), chlorine atom (Cl), bromine atom (Br), or iodine atom (I). The term “halide” means the anionic form of the halogen atom: fluoride ($F^-$), chloride ($Cl^-$), bromide ($Br^-$), or iodide ($I^-$).

The term “independently selected” means that the R groups, such as, $R^1$, $R^2$, and $R^3$, can be identical or different (e.g., $R^1$, $R^2$, and $R^3$ may all be substituted alkyls; or $R^1$ and $R^2$ may be a substituted alkyl, and $R^3$ may be an aryl). A chemical name associated with an R group is intended to convey the chemical structure that is recognized in the art as corresponding to that of the chemical name. As a result, chemical names are intended to supplement and illustrate, not preclude, the structural definitions known to those of skill in the art.

The term “procatalyst” means a compound that has catalytic activity when combined with an activator. The term “activator” means a compound that chemically reacts with a procatalyst in a manner that converts the procatalyst to a catalytically active compound. As used in the present disclosure, the terms “co-catalyst” and “activator” are interchangeable, and have identical meanings unless clearly specified.

The term “substitution” means that at least one hydrogen atom (—H) bonded to a carbon atom of a corresponding unsubstituted compound or functional group is replaced by a substituent (e.g., $R^S$). The term “—H” means a hydrogen or hydrogen radical that is covalently bonded to another atom. As used in the present disclosure, the terms “hydrogen” and “—H” are interchangeable, and have identical meanings unless clearly specified.

When used to describe certain carbon atom-containing chemical groups, a parenthetical expression having the form “($C_x$-$C_y$)” means that the unsubstituted form of the chemical group has from x carbon atoms to y carbon atoms, inclusive of x and y. For example, a ($C_1$-$C_{50}$)alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the “($C_x$-$C_y$)” parenthetical may contain more than y carbon atoms depending on the identity of any groups $R^S$. For example, a “($C_1$-$C_{50}$)alkyl substituted with exactly one group $R^S$, where $R^S$ is phenyl (—$C_6H_5$)” may contain from 7 to 56 carbon atoms. As a result, when a chemical group defined using the “($C_x$-$C_y$)” parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term “($C_1$-$C_{50}$)hydrocarbyl” means a hydrocarbon radical of from 1 to 50 carbon atoms and the term “($C_1$-$C_{50}$)hydrocarbylene” means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted. As used in the present disclosure, a ($C_1$-$C_{50}$) hydrocarbyl may be an unsubstituted or substituted ($C_1$-$C_{50}$) alkyl, ($C_3$-$C_{50}$)cycloalkyl, ($C_3$-$C_{25}$)cycloalkyl-($C_1$-$C_{25}$)alkylene, ($C_6$-$C_{50}$)aryl, or ($C_6$-$C_{25}$)aryl-($C_1$-$C_{25}$)alkylene (such as benzyl(—$CH_2$—$C_6H_5$)).

The term "($C_1$-$C_{50}$)alkyl" means a saturated straight or branched hydrocarbon radical containing from 1 to 50 carbon atoms. Each ($C_1$-$C_{50}$)alkyl may be unsubstituted or substituted by one or more $R^S$. In embodiments, each hydrogen atom in a hydrocarbon radical may be substituted with $R^S$, such as, for example, trifluoromethyl. Examples of unsubstituted ($C_1$-$C_{50}$)alkyl are unsubstituted ($C_1$-$C_{20}$)alkyl; unsubstituted ($C_1$-$C_{10}$)alkyl; unsubstituted ($C_1$-$C_{50}$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{50}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" means there is a maximum of 45 carbon atoms in the radical, including substituents, and is, for example, a ($C_{27}$-$C_{40}$)alkyl substituted by one $R^S$, which is a ($C_1$-$C_{50}$)alkyl, such as, for example, methyl, trifluoromethyl, ethyl, 1-propyl, 1-methylethyl, or 1,1-dimethylethyl.

The term "($C_3$-$C_{50}$)cycloalkyl" means a saturated cyclic hydrocarbon radical of from 3 to 50 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{50}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{50}$)cycloalkyl are substituted ($C_3$-$C_{20}$)cycloalkyl, substituted ($C_3$-$C_{10}$)cycloalkyl, and 1-fluorocyclohexyl.

The term "($C_6$-$C_{50}$)aryl" means an unsubstituted or substituted (by one or more $R^S$) mono-, bi- or tricyclic aromatic hydrocarbon radical of from 6 to 50 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclyc aromatic hydrocarbon radical is present, at least one of the rings of the radical is aromatic. The other ring or rings of the aromatic radical may be independently fused or non-fused and aromatic or non-aromatic. Examples of unsubstituted ($C_6$-$C_{50}$)aryl include: unsubstituted ($C_6$-$C_{20}$)aryl, unsubstituted ($C_6$-$C_{18}$)aryl; 2-($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{50}$)aryl include: substituted ($C_1$-$C_{20}$)aryl; substituted ($C_6$-$C_{18}$)aryl; 2,4-bis([$C_{20}$]alkyl)-phenyl; polyfluorophenyl; pentafluorophenyl; and fluoren-9-one-1-yl.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, —N═$C(R)_2$, —$Ge(R^C)_2$—, or —Si($R^C$)—, where each $R^C$ and each $R^P$, is unsubstituted ($C_1$-$C_{18}$)hydrocarbyl or —H—, and where each $R^N$ is unsubstituted ($C_1$-$C_{18}$)hydrocarbyl. The term "heterohydrocarbon" refers to a molecule or molecular framework in which one or more carbon atoms of a hydrocarbon are replaced with a heteroatom. The term "($C_1$-$C_{50}$)heterohydrocarbyl" means a heterohydrocarbon radical of from 1 to 50 carbon atoms, and the term "($C_1$-$C_{50}$)heterohydrocarbylene" means a heterohydrocarbon diradical of from 1 to 50 carbon atoms. The heterohydrocarbon of the ($C_1$-$C_{50}$)heterohydrocarbyl or the ($C_1$-$C_{50}$)heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each ($C_1$-$C_{50}$)heterohydrocarbyl and ($C_1$-$C_{50}$)heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The term "($C_2$-$C_{50}$)heteroaryl" means an unsubstituted or substituted (by one or more $R^S$) mono-, bi-, or tricyclic heteroaromatic hydrocarbon radical of from 2 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., ($C_x$-$C_y$)heteroaryl generally, such as ($C_4$-$C_{12}$)heteroaryl) are defined in an analogous manner as having from x to y carbon atoms (such as 4 to 12 carbon atoms) and being unsubstituted or substituted by one or more than one s. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The term "polymer" refers to polymeric compounds prepared by polymerizing monomers, whether of the same or a different type. The generic term polymer thus includes homopolymers, which are polymers prepared by polymerizing only one monomer, and copolymers, which are polymers prepared by polymerizing two or more different monomers.

The term "interpolymer" refers to polymers prepared by polymerizing at least two different types of monomers. The generic term interpolymer thus includes copolymers and other polymers prepared by polymerizing more than two different monomers, such as terpolymers.

The terms "polyolefin," "polyolefin polymer," and "polyolefin resin" refer to polymers prepared by polymerizing a simple olefin (also referred to as an alkene, which has the general formula $C_nH_{2n}$) monomer. The generic term polyolefin thus includes polymers prepared by polymerizing ethylene monomer with or without one or more comonomers, such as polyethylene, and polymers prepared by polymerizing propylene monomer with or without one or more comonomers, such as polypropylene.

The terms "polyethylene" and "ethylene-based polymer" refer to polyolefins comprising greater than 50 percent (%) by mole of units that have been derived from ethylene monomer, which includes polyethylene homopolymers and copolymers. Common forms of polyethylene known in the art include Low Density Polyethylene (LDPE), Linear Low Density Polyethylene (LLDPE), Ultra Low Density Polyethylene (ULDPE), Very Low Density Polyethylene (VLDPE), Medium Density Polyethylene (MDPE), and High Density Polyethylene (HDPE).

The term "molecular weight distribution" means a ratio of two different molecular weights of a polymer. The generic term molecular weight distribution includes a ratio of a weight average molecular weight ($M_w$) of a polymer to a number average molecular weight ($M_n$) of the polymer, which may also be referred to as a "molecular weight distribution ($M_w/M_n$)," and a ratio of a z-average molecular weight ($M_z$) of a polymer to a weight average molecular weight ($M_w$) of the polymer, which may also be referred to as a "molecular weight distribution ($M_z/M_w$)."

The term "composition" means a mixture of materials that comprises the composition, as well as reaction products and decomposition products formed from the materials of the composition.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

In embodiments, the catalyst system includes a procatalyst. The procatalyst includes a metal-ligand complex. The metal-ligand complex may have a structure according to formula (I):

(I)

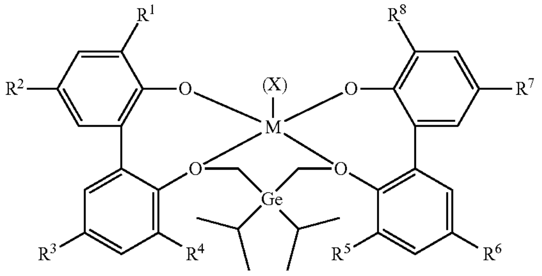

In formula (I), M is titanium (Ti), zirconium (Zr), or hafnium (Hf). In embodiments, M is titanium, zirconium, or hafnium, each independently being in a formal oxidation state of +2, +3, or +4.

In formula (I), subscript n of $(X)_n$ is 1, 2, or 3, and each X is a monodentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, $(C_1\text{-}C_{50})$heterohydrocarbyl, $(C_6\text{-}C_{50})$aryl, $(C_2\text{-}C_{50})$heteroaryl, halogen, $—N(R^N)_2$, and $—N(R^N)COR^C$. In embodiments, each X is independently chosen from methyl; ethyl; 1-propyl; 2-propyl; 1-butyl; 2,2,-dimethylpropyl; trimethylsilylmethyl; phenyl; benzyl; or chloro. In some embodiments, subscript n of $(X)_n$ is 2 and each X is the same. In other embodiments, at least two X are different. For example, subscript n of $(X)_n$ may be 2 and each X may be a different one of methyl; ethyl; 1-propyl; 2-propyl; 1-butyl; 2,2,-dimethylpropyl; trimethylsilylmethyl; phenyl; benzyl; and chloro. In embodiments, subscript n of $(X)_n$ is 1 or 2 and at least two X independently are monoanionic monodentate ligands and a third X, if present, is a neutral monodentate ligand. In or more embodiments, subscript n of $(X)_n$ is 2. In formula (I), the metal-ligand complex is overall charge-neutral.

In formula (I), $R^1$ and $R^8$ are independently chosen from radicals having formula (II) and radicals having formula (III):

(II)

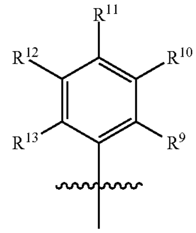

(III)

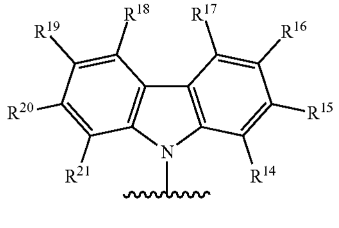

In formula (II), $R^9$, $R^{10}$, $R^{11}$, $R^{12}$, $R^{13}$ are independently chosen from —H, $(C_1\text{-}C_{50})$hydrocarbyl, $(C_1\text{-}C_{50})$heterohydrocarbyl, $—Si(R^C)_3$, $—Ge(R^C)_3$, $P(R^P)_2$, $—N(R^N)_2$, $—OR^C$, $—SR^C$, $—NO_2$, $—CN$, $—CF_3$, $R^CS(O)—$, $R^CS(O)_2$—, $(R^C)_2C$=N—, $R^CC(O)O$—, $R^COC(O)$—, $R^CC(O)N(R^N)$—, $(R^C)_2NC(O)$—, or halogen.

In formula (III), $R^{14}$, $R^{15}$, $R^{16}$, $R^{17}$, $R^{18}$, $R^{19}$, $R^{20}$, and $R^{21}$ are independently chosen from —H, $(C_1\text{-}C_{50})$hydrocarbyl, $(C_1\text{-}C_{50})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$=N—, $R^CC(O)O$—, $R^COC(O)$—, $R^CC(O)N(R^N)$—, $(R^C)_2NC(O)$—, or halogen.

The groups $R^1$ and $R^8$ in the metal-ligand complex of formula (I) are chosen independently of one another. For example, $R^1$ may be chosen from a radical having formula (II) or (III), and $R^8$ may be a $(C_2\text{-}C_{50})$heteroaryl; or $R^1$ may be chosen from a radical having formula (II), (III), or (IV), and $R^{16}$ may be chosen from a radical having formula (II) or (III), the same as or different from that of $R^1$. In embodiments, both $R^1$ and $R^8$ are radicals having formula (II), for which the groups $R^{9\text{-}13}$ are the same or different in $R^1$ and $R^8$. In some embodiments, both $R^1$ and $R^8$ are radicals having formula (III), for which the groups $R^{14\text{-}21}$ are the same or different in $R^1$ and $R^8$.

In embodiments, at least one of $R^1$ and $R^8$ is a radical having formula (II), where at least one of $R^{10}$ and $R^{12}$ are tert-butyl. In some embodiments, when at least one of $R^1$ or $R^8$ is a radical having formula (III), one of or both of $R^{16}$ and $R^{19}$ is tert-butyl and $R^{14\text{-}15}$, $R^{17\text{-}18}$, and $R^{20\text{-}21}$ are —H. In other embodiments, one of or both of $R^{15}$ and $R^{20}$ is tert-butyl and $R^{14}$, $R^{16\text{-}19}$, and $R^{21}$ are —H. In some embodiments, both $R^{15}$ and $R^{20}$ are —H. In some embodiments, $R^{14\text{-}21}$ are —H.

In formula (I), $R^2$, $R^3$, $R^4$, $R^5$, $R^6$, $R^7$, and $R^8$ are independently chosen from —H, $(C_1\text{-}C_{50})$hydrocarbyl, $(C_1\text{-}C_{50})$heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$=N—, $R^CC(O)O$—, $R^COC(O)$—, $R^CC(O)N(R)$—, $(R^C)_2NC(O)$—, and halogen.

In some embodiments, at least one of $R^3$ or $R^4$ is a halogen atom; and at least one of $R^5$ or $R^6$ is a halogen atom. In some embodiments, both of $R^3$ and $R^4$ are halogen atoms; and both or $R^5$ or $R^6$ are halogen atoms.

In embodiments, $R^2$ and $R^7$ are $(C_1\text{-}C_{24})$alkyl. In various embodiments, $R^2$ and $R^7$ are $(C_1\text{-}C_{20})$alkyl. In some embodiments, $R^2$ and $R^7$ are $(C_4\text{-}C_{24})$alkyl. In one or more embodiments, $R^2$ and $R^7$ are $(C_8\text{-}C_{12})$alkyl. In some embodiments, $R^2$ and $R^7$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, $R^2$ and $R^7$ are —$OR^C$, wherein $R^C$ is $(C_1\text{-}C_{20})$ hydrocarbon, and in some embodiments, $R^C$ is methyl, ethyl, 1-propyl, 2-propyl (also called iso-propyl), or 1,1-dimethylethyl.

In some embodiments, $R^4$ and $R^5$ are $(C_1\text{-}C_{20})$alkyl. In some embodiments, $R^4$ and $R^5$ are 1-propyl, 2-propyl (also called iso-propyl), 1,1-dimethylethyl (also called tert-butyl), cyclopentyl, cyclohexyl, 1-butyl, pentyl, 3-methyl-1-butyl, hexyl, 4-methyl-1-pentyl, heptyl, n-octyl, tert-octyl (also called 2,4,4-trimethylpentan-2-yl), nonyl, and decyl. In embodiments, $R^4$ and $R^5$ are methyl.

In some embodiments, $R^3$ and $R^6$ are halogen. In other embodiments, $R^3$ and $R^6$ are $(C_1\text{-}C_{24})$alkyl. In some embodiments, $R^3$ and $R^6$ independently are chosen from methyl, ethyl, 1-propyl, 2-propyl (also called iso-propyl), 1,1-dimethylethyl (also called tert-butyl), cyclopentyl, cyclohexyl, 1-butyl, pentyl, 3-methylbutyl, hexyl, 4-methylpentyl, heptyl, n-octyl, tert-octyl (also called 2,4,4-trimethylpentan-2-yl), nonyl, and decyl. In some embodiments, $R^6$ and $R^{11}$ are tert-butyl. In embodiments, $R^3$ and $R^6$ are —$OR^C$, wherein $R^C$ is $(C_1\text{-}C_{20})$hydrocarbyl, and in some embodiments, $R^C$ is methyl, ethyl, 1-propyl, 2-propyl (also called iso-propyl), or 1,1-dimethylethyl. In other embodiments, $R^3$ and $R^6$ are —$SiR^C_3$, wherein each $R^C$ is independently $(C_1\text{-}C_{20})$hydrocarbyl, and in some embodiments, $R^C$ is methyl, ethyl, 1-propyl, 2-propyl (also called iso-propyl), or 1,1-dimethylethyl.

In some embodiments, $R^2$ and $R^7$ are methyl and $R^3$ and $R^6$ are halogen. In other embodiments, $R^3$ and $R^6$ are tert-butyl. In other embodiments, $R^2$ and $R^7$ are tert-octyl or n-octyl.

In formulas (I), (Ia), (II), and (III), each $R^C$, $R^P$, and $R^N$ are independently chosen from —H, $(C_1\text{-}C_{50})$hydrocarbyl, and $(C_1\text{-}C_{50})$heterohydrocarbyl.

In embodiments, the procatalyst may be rendered catalytically active by contacting it to, or combining it with, an activator. A procatalyst that has been rendered catalytically active by contacting it to, or combining it with, an activator may be referred to as a "catalyst system." That is, as used in the present disclosure, a catalyst system may include a procatalyst and one or more activators. The term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 10,000-fold molar excess Al/M over the catalyst precursor (per metal catalytic site). Alternatively, or additionally the minimum amount of activator-to-catalyst-precursor may be set at a 1:1 molar ratio. In embodiments, the amount of activator-to-catalyst-precursor may be selected from 10,000:1 Al/M, from 5,000:1 Al/M, from 1,000:1 Al/M, from 500:1 Al/M, from 250:1 Al/M, from 150:1 Al/M, from 120:1 Al/M, from 100:1 Al/M, from 50:1 Al/M, from 20: Al/M, from 10:1 Al/M, from 5:1 Al/M, from 1:1 Al/M.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

When the neutral metal-ligand complex is rendered catalytically active by an activator, the metal of the metal-ligand complex may have a formal charge of positive one (+1). In embodiments in which the procatalyst includes the metal-ligand complex, the metal-ligand complex has a structure according to formula (I) and is overall charge neutral. In embodiments in which the catalyst system includes the metal-ligand complex, the metal-ligand complex may have a structure according to formula (Ia) and has an overall formal charge of positive one (+1):

(Ia)

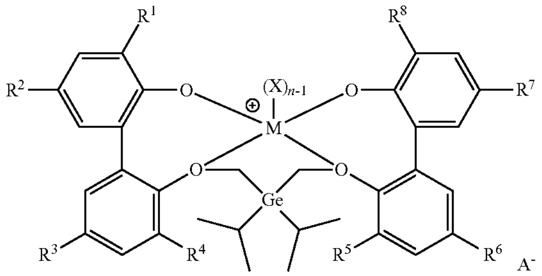

In formula (Ia), $A^-$ is an anion, and M, subscript n of $(X)_n$, each X, each Z, and $R^1$—$R^8$, are as described previously with regard to the metal-ligand complex of formula (I).

Formula (Ia) is a illustrative depiction of an active catalyst.

In embodiments, the metal-ligand complex, the activator, or both, may be disposed on one or more support materials. For example, the metal-ligand complex may be deposited on, contacted with, vaporized with, bonded to, or incorporated within, adsorbed or absorbed in, or on, one or more support materials. The metal-ligand complex may be combined with one or more support materials using one of the support methods well known in the art or as described below. As used in the present disclosure, the metal-ligand complex is in a supported form, for example, when deposited on, contacted with, or incorporated within, adsorbed or absorbed in, or on, one or more support materials.

Suitable support materials, such as inorganic oxides, include oxides of metals of Group 2, 3, 4, 5, 13 or 14 of the IUPAC periodic table. In embodiments, support materials include silica, which may or may not be dehydrated, fumed silica, alumina (e.g., as described in International Patent Application No. 1999/060033), silica-alumina, and mixtures of these. The fumed silica may be hydrophilic (untreated), alternatively hydrophobic (treated). In embodiments, the support material is hydrophobic fumed silica, which may be prepared by treating an untreated fumed silica with a treating agent, such as dimethyldichlorosilane, a polydimethylsiloxane fluid, or hexamethyldisilazane. In some embodiments, support materials include magnesia, titania, zirconia, magnesium chloride (e.g., as described in U.S. Pat. No. 5,965,477), montmorillonite (e.g., as described in European Patent No. 0 511 665), phyllosilicate, zeolites, tale, clays (e.g., as described in U.S. Pat. No. 6,034,187), and mixtures of these. In other embodiments, combinations of these support materials may be used, such as, for example, silica-chromium, silica-alumina, silica-titania, and combinations of these. Additional support materials may also include those porous acrylic polymers described in European Patent No. 0 767 184. Other support materials may also include nanocomposites described in International Patent Application No. 1999/047598; aerogels described in International Patent Application No. 1999/048605; spherulites described in U.S. Pat. No. 5,972,510; and polymeric beads described in International Patent Application No. 1999/050311.

In embodiments, the support material has a surface area of from 10 square meters per gram ($m^2/g$) to 700 $m^2/g$, a pore volume of from 0.1 cubic meters per gram ($cm^3/g$) to 4.0 $cm^3/g$, and an average particle size of from 5 microns (μm) to 500 μm. In some embodiments, the support material has a surface area of from 50 $m^2/g$ to 500 $m^2/g$, a pore volume of from 0.5 $cm^3/g$ to 3.5 $cm^3/g$, and an average particle size of from 10 μm to 200 μm. In other embodiments, the support material may have a surface area of from 100 $m^2/g$ to 400 $m^2/g$, a pore volume from 0.8 $cm^3/g$ to 3.0 $cm^3/g$, and an average particle size of from 5 μm to 100 μm. The average pore size of the support material is typically from 10 Angstroms (Å) to 1,000 Å, such as from 50 Å to 500 Å or from 75 Å to 350 Å.

There are various suitable methods to produce the catalyst systems of the present disclosure. In one or more embodiments, methods for producing the catalyst system include contacting one or more support materials, one or more activators, and a metal-ligand complex in an inert hydrocarbon solvent to produce the catalyst system. In some embodiments, the method for producing the catalyst system may include disposing the one or more activators on the one or more support materials to produce a supported activator, and contacting the supported activator with a solution of the metal-ligand complex in an inert hydrocarbon solvent (often referred to as a "trim catalyst" or a "trim feed"). For example, in some embodiments, methods for producing the catalyst system include contacting a spray-dried supported activator (i.e., a supported activator produced via pray drying) with a solution of the metal-ligand complex in an inert hydrocarbon solvent. In some embodiments, the supported activator may be included in a slurry, such as, for example a mineral oil slurry.

In some embodiments, the method for producing the catalyst system may include mixing one or more support materials, one or more activators, and a metal-ligand complex to produce a catalyst system precursor. The methods may further include drying the catalyst system precursor to produce the catalyst system. More specifically, the methods may include making a mixture of the metal-ligand complex, one or more support materials, one or more activators, or a combinations of these, and an inert hydrocarbon solvent. The inert hydrocarbon solvent may then be removed from the mixture so as to produce the metal-ligand complex, the one or more activators, or combinations of these, disposed on the one or more support materials. In embodiments, the removing step may be achieved via conventional evaporating of the inert hydrocarbon solvent from the mixture (i.e., conventional concentrating method), which yields an evaporated/supported catalyst system. In other embodiments, the removing step may be achieved by spray-drying the mixture, which produces spray-dried particles. It should be understood that the drying and/or removing steps may not result in the complete removal of liquids from the resulting catalyst system. That is, the catalyst system may include residual amounts (i.e., from 1 wt. % to 3 wt. %) of the inert hydrocarbon solvent.

As noted previously, the catalyst systems of the present disclosure may be utilized in processes for producing polymers, such as polyethylene, via the polymerization of olefins, such as ethylene. When utilized in some polymerization processes, such as gas-phase polymerization, catalyst systems that include BPP metal-ligand complexes typically exhibit: 1) operability issues associated with rapid light-off; and/or 2) poor productivity. For example, catalyst systems that include BPP metal-ligand complexes may light-off too fast in a gas-phase polymerization reactor, that is rapidly consume ethylene too fast upon injection, leading to particle overheating, melting and agglomeration causing catalyst ball formation, chunking, and other "rubble" that can foul a gas-phase polymerization reactor.

In embodiments, one or more olefins may be contacted with the catalyst systems of the present disclosure in a gas-phase polymerization reactor, such as a gas-phase fluidized bed polymerization reactor. Exemplary gas-phase systems are described in U.S. Pat. Nos. 5,665,818; 5,677,375; and 6,472,484; and European Patent Nos. 0 517 868 and 0 794 200. For example, in some embodiments, ethylene and, optionally, one or more $(C_3\text{-}C_{12})\alpha$-olefin comonomers may be contacted with the catalyst systems of the present disclosure in a gas-phase polymerization reactor. The catalyst system may be fed to the gas-phase polymerization reactor in neat form (i.e., as a dry solid), as a solution, or as a slurry. For example, in some embodiments, spray-dried particles of the catalyst system may be fed directly to the gas-phase polymerization reactor. In other embodiments, a solution or slurry of the catalyst system in a solvent, such as an inert hydrocarbon or mineral oil, may be fed to the reactor. For example, the procatalyst may be fed to the reactor in an inert hydrocarbon solution and the activator may be fed to the reactor in a mineral oil slurry.

In embodiments, the gas-phase polymerization reactor comprises a fluidized bed reactor. A fluidized bed reactor may include a "reaction zone" and a "velocity reduction zone." The reaction zone may include a bed of growing polymer particles, formed polymer particles, and a minor amount of the catalyst system fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; European Patent No. 0 802 202; and Belgian Patent No. 839,380.

The catalyst systems with rapid light-offs can foul a gas phase polymerization reactor by forming "cat balls" or chunks, which can block catalyst injection, polymer particle removal, or create other issues detrimental to operability. Chunking and "cat ball" formation are phenomena that are thought to be exacerbated by polymer particles overheating and fusing due to the rapid light-off a catalyst. The light-off of a catalyst system can be conveniently expressed in terms of the ethylene uptake, or ethylene consumption, and the ethylene uptake ratio, Ut, which is given by the formula (IV)

$$U_t = \frac{\sum_{t=0}^{t} C2(t)}{\sum_{t=0}^{t_R} C2(t)} \tag{IV}$$

wherein, the total ethylene uptake of the catalyst system over the average residence time, tR, of the polymerization process is given by formula (V), and the ethylene uptake at a given time following the injection of the catalyst system into the polymerization reactor is given by formula (VI):

$$\sum_{t=0}^{t_R} C2(t) \tag{V}$$

$$\sum_{t=0}^{t} C2(t) \tag{VI}$$

The light-off can be controlled in the process by increasing or decreasing the catalyst feed rate or increasing or decreasing the ethylene partial pressure in the reactor; however alleviating the severity of the catalyst light-off and associated reactor operability issues by either decreasing the catalyst feed rate or decreasing the ethylene partial pressure is often not practical as it decreases reactor yields and the amount of polymer produced per unit time, which ultimately is not economical on production scale polymerization reactors. Additionally, the large component of the light-off of the catalyst system is inherent to the activated metal-ligand complex of the catalyst system. Herein a structural feature of the active organometallic component of the catalyst system is described as having improved the operability of a catalyst by changing the inherent light-off of the catalyst system.

In this disclosure, a catalyst system having a favorable light-off is quantified by the formula (VII), wherein the amount of ethylene consumed during the first 5 minutes of the catalyst lifetime is less than 25% of the total ethylene consumed for the time of the entirety of the average residence time, $t_R$, upon initial addition of the catalyst system, wherein the time at which 25% of the total ethylene uptake ($t_{25\%}$) is calculated by the equation according to formula (IV):

$$\frac{\sum_{t=0}^{t_{25\%}} C2(t)}{\sum_{t=0}^{t_R} C2(t)} = 0.25, \text{ and } t_{25\%} > 5 \text{ min} \tag{VII}$$

Alternatively, the light-off can be quantified when the uptake ratio ($U_t$), or percent of ethylene consumed at a specific time, t, following the delivery of the catalyst system into the polymerization reactor, compared to the total ethylene consumed during the entirety of either the catalyst lifetime or the average residence time, $t_R$, whichever is shorter, and can be calculated according to formula (IV). For instance, the $U_t$ of the catalyst system is less than or equal to 0.02 (2 percent) at the time point of 0.5 minutes (30 seconds) after the catalyst system is fed into the reactor as given by the formulae (X) and (XI):

$$\text{Uptake at 30 sec (0.5 min), } U_{0.5} = \frac{\sum_{t=0}^{0.5} C2(t)}{\sum_{t=0}^{t_R} C2(t)} \leq 0.02 \tag{X}$$

-continued $$\text{Uptake at 30 sec (0.5 min)}, U_{0.5} = \int_0^{0.5} C2(t)dt \leq 0.02 \quad \text{(XI)}$$

The ethylene uptake and ethylene uptake ratio of a catalyst system can be measured by the Light-Off Batch Reactor Test Method.

In embodiments, the reactor temperature of the gas-phase polymerization reactor is from 70° C. to 150° C. For example, the reactor temperature of the gas-phase polymerization reactor may be from 70° C. to 120° C., from 70° C. to 110° C., from 70° C. to 100° C., from 90° C. to 150° C., from 90° C. to 120° C., from 90° C. to 110° C., from 90° C. to 100° C., from 100° C. to 150° C., from 100° C. to 120° C., from 100° C. to 110° C., from 110° C. to 150° C., from 110° C. to 120° C., or from 120° C. to 150° C. Generally, the gas-phase polymerization reactor may be operated at the highest temperature feasible, taking into account the sintering temperature of the polymer product within the reactor. Regardless of the process used to make the polyethylene, the reactor temperature should be below the melting or "sintering" temperature of the polymer product. As a result, the upper temperature limit may be the melting temperature of the polymer product.

In some embodiments, the process of the disclosure further includes an internal reactor temperature, wherein the internal reactor temperature is approximately the reactor temperature plus or minus 5 degrees Celsius. In various embodiments, the internal reactor temperature is plus or minus 3° C. of the reactor temperature or plus or minus 2° C. of the reactor temperature; and in one or more embodiments, the internal reactor temperature is plus or minus 1° C. of the reactor temperature.

Rapid light-off causes operability issues due to rapid consumption of ethylene and/or comonomer leading to particle overheating, and perhaps is better quantified in terms of the internal reactor temperature ($T_{int}$), which is a measure of the heat of polymerization and an indirect measure of the catalyst particle temperature. $T_{int}$ is a convenient way of quantifying and comparing the severity of the light-off of different catalysts in semi-batch gas phase polymerization process.

In some embodiments, the reactor pressure of the gas-phase polymerization reactor is from 50 psi to 150 psi (345 kPa to 1035 kPa). For example, the reactor pressure of the gas-phase polymerization reactor may be from 80 psi to 115 psi (552 kPa to 793 kPa), from 90 psi to 130 psi (620.5 kPa to 896 kPa) or from 100 psi to 150 psi (690 kPa to 1035 kPa).

In one or more embodiments, the reactor pressure of the gas-phase polymerization reactor is greater than or equal to 150 psi (1035 kPa). In various embodiments, the reactor pressure of the gas-phase polymerization reactor is greater than or equal to 180 psi (1241 kPa), greater than or equal to 190 psi (1310 kPa), greater than or equal to 200 psi (1379 kPa), or greater than or equal to 230 psi (1586 kPa).

In some embodiments, the amount of ethylene consumed during the first 5 minutes upon injection of the catalyst system into the gas-phase polymerization reactor is less than 25% of the total ethylene consumed for the time of the entirety of the average residence time, $t_R$, upon initial addition of the catalyst system, wherein the time at which 25% of the total ethylene uptake ($t_{25\%}$) is calculated by the equation according to formula (IV):

$$\frac{\sum_{t=0}^{t_{25\%}} C2(t)}{\sum_{t=0}^{t_R} C2(t)} = 0.25, \text{ and } t_{25\%} > 5 \text{ min.} \quad \text{(IV)}$$

In one or more embodiments, the amount of ethylene consumed during the first 25 minutes upon injection of the catalyst system into the gas-phase polymerization reactor is less than 50% of the total ethylene consumed for the time of the entirety of the average residence time, $t_R$, upon initial addition of the catalyst system, wherein the time at which 25% of the total ethylene uptake ($t_{25\%}$) is calculated by the equation according to formula (IV):

$$\frac{\sum_{t=0}^{t_{25\%}} C2(t)}{\sum_{t=0}^{t_R} C2(t)} = 0.25, \text{ and } t_{25\%} > 5 \text{ min.} \quad \text{(IV)}$$

In embodiments, hydrogen gas may be used during polymerization to control the final properties of the polyethylene. The amount of hydrogen in the polymerization may be expressed as a mole ratio relative to the total polymerizable monomer, such as, for example, ethylene or a blend of ethylene and 1-hexene. The amount of hydrogen used in the polymerization process may be an amount necessary to achieve the desired properties of the polyethylene, such as, for example, melt flow rate (MFR). In embodiments, the mole ratio of hydrogen to total polymerizable monomer ($H_2$:monomer) is greater than 0.0001. For example, the mole ratio of hydrogen to total polymerizable monomer ($H_2$:monomer) may be from 0.0001 to 10, from 0.0001 to 5, from 0.0001 to 3, from 0.0001 to 0.10, from 0.0001 to 0.001, from 0.0001 to 0.0005, from 0.0005 to 10, from 0.0005 to 5, from 0.0005 to 3, from 0.0005 to 0.10, from 0.0005 to 0.001, from 0.001 to 10, from 0.001 to 5, from 0.001 to 3, from 0.001 to 0.10, from 0.10 to 10, from 0.10 to 5, from 0.10 to 3, from 3 to 10, from 3 to 5, or from 5 to 10.

In embodiments, the catalyst systems of the present disclosure may be utilized to polymerize a single type of olefin, producing a homopolymer. However, additional α-olefins may be incorporated into the polymerization scheme in other embodiments. The additional α-olefin comonomers typically have no more than 20 carbon atoms. For example, the catalyst systems of the present disclosure may be utilized to polymerize ethylene and one or more $(C_3\text{-}C_{12})$α-olefin comonomers. Exemplary α-olefin comonomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or, in the alternative, from the group consisting of 1-hexene and 1-octene.

In embodiments, the one or more $(C_3\text{-}C_{12})$α-olefin comonomers may not be derived from propylene. That is, the one or more $(C_3\text{-}C_{12})$α-olefin comonomers may be substantially free of propylene. The term "substantially free" of a compound means the material or mixture includes less than 1.0 wt. % of the compound. For example, the one or more $(C_3\text{-}C_{12})$α-olefin comonomers, which may be substantially free of propylene, may include less than 1.0 wt. % propylene, such as less than 0.8 wt. % propylene, less than 0.6 wt. % propylene, less than 0.4 wt. % propylene, or less than 0.2 wt. % propylene.

In embodiments, the polyethylene produced, for example homopolymers and/or interpolymers (including copolymers) of ethylene and, optionally, one or more comonomers may include at least 50 mole percent (mol. %) monomer units derived from ethylene. For example, the polyethylene may include at least 60 mol. %, at least 70 mol. %, at least 80 mol. %, or at least 90 mol. % monomer units derived from ethylene. In embodiments, the polyethylene includes from 50 mol. % to 100 mol. % monomer units derived from ethylene. For example, the polyethylene may include from 50 mol. % to 90 mol. %, from 50 mol. % to 80 mol. %, from 50 mol. % to 70 mol. %, from 50 mol. % to 60 mol. %, from 60 mol. % to 100 mol. %, from 60 mol. % to 90 mol. %, from 60 mol. % to 80 mol. %, from 60 mol. % to 70 mol. %, from 70 mol. % to 100 mol. %, from 70 mol. % to 90 mol. %, from 70 mol. % to 80 mol. %, from 80 mol. % to 100 mol. %, from 80 mol. % to 90 mol. %, or from 90 mol. % to 100 mol. % monomer units derived from ethylene.

In embodiments, the polyethylene produced includes at least 90 mol. % monomer units derived from ethylene. For example, the polyethylene may include at least 93 mol. %, at least 96 mol. %, at least 97 mol. %, or at least 99 mol. % monomer units derived from ethylene. In embodiments, the polyethylene includes from 90 mol. % to 100 mol. % monomer units derived from ethylene. For example, the polyethylene may include from 90 mol. % to 99.5 mol. %, from 90 mol. % to 99 mol. %, from 90 mol. % to 97 mol. %, from 90 mol. % to 96 mol. %, from 90 mol. % to 93 mol. %, from 93 mol. % to 100 mol. %, from 93 mol. % to 99.5 mol. %, from 93 mol. % to 99 mol. %, from 93 mol. % to 97 mol. %, from 93 mol. % to 96 mol. %, from 96 mol. % to 100 mol. %, from 96 mol. % to 99.5 mol. %, from 96 mol. % to 99 mol. %, from 96 mol. % to 97 mol. %, from 97 mol. % to 100 mol. %, from 97 mol. % to 99.5 mol. %, from 97 mol. % to 99 mol. %, from 99 mol. % to 100 mol. %, from 99 mol. % to 99.5 mol. %, or from 99.5 mol. % to 100 mol. % monomer units derived from ethylene.

In embodiments, the polyethylene produced includes less than 50 mol. % monomer units derived from an additional α-olefin. For example, the polyethylene may include less than 40 mol %, less than 30 mol. %, less than 20 mol. % or less than 10 mol. % monomer units derived from an additional α-olefin. In embodiments, the polyethylene includes from 0 mol. % to 50 mol. % monomer units derived from an additional α-olefin. For example, the polyethylene may include from 0 mol. % to 40 mol. %, from 0 mol. % to 30 mol. %, from 0 mol. % to 20 mol. %, from 0 mol. % to 10 mol. %, from 0 mol. % to 5 mol. %, from 0 mol. % to 1 mol. %, from 1 mol. % to 50 mol. %, from 1 mol. % to 40 mol. %, from 1 mol. % to 30 mol. %, from 1 mol. % to 20 mol. %, from 1 mol. % to 10 mol. %, from 1 mol. % to 5 mol. %, from 5 mol. % to 50 mol. %, from 5 mol. % to 40 mol. %, from 5 mol. % to 30 mol. %, from 5 mol. % to 20 mol. %, from 5 mol. % to 10 mol. %, from 10 mol. % to 50 mol. %, from 10 mol. % to 40 mol. %, from 10 mol. % to 30 mol. %, from 10 mol. % to 20 mol. %, from 20 mol. % to 50 mol. %, from 20 mol. % to 40 mol. %, from 20 mol. % to 30 mol. %, from 30 mol. % to 50 mol. %, from 30 mol. % to 40 mol. %, or from 40 mol. % to 50 mol. % monomer units derived from an additional α-olefin.

In embodiments, the polyethylene produced further includes one or more additives. Such additives include, but are not limited to, antistatic agents, color enhancers, dyes, lubricants, pigments, primary antioxidants, secondary antioxidants, processing aids, ultraviolet (UV) stabilizers, and combinations of these. The polyethylene may include any amounts of additives. In embodiments, the produced polyethylene further includes fillers, which may include, but are not limited to, organic or inorganic fillers, such as, for example, calcium carbonate, talc, or $Mg(OH)_2$.

The produced polyethylene may be used in a wide variety of products and end-use applications. The produced polyethylene may also be blended and/or co-extruded with any other polymer. Non-limiting examples of other polymers include linear low density polyethylene, elastomers, plastomers, high pressure low density polyethylene, high density polyethylene, polypropylenes, and the like. The produced polyethylene and blends including the produced polyethylene may be used to produce blow-molded components or products, among various other end uses. The produced polyethylene and blends including the produced polyethylene may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, and membranes in food-contact and non-food contact applications. Fibers may include melt spinning, solution spinning and melt blown fiber operations for use in woven or non-woven form to make filters, diaper fabrics, medical garments, and geotextiles. Extruded articles may include medical tubing, wire and cable coatings, pipe, geomembranes, and pond liners. Molded articles may include single and multi-layered constructions in the form of bottles, tanks, large hollow articles, rigid food containers and toys.

Test Methods

Polymerization Activity

Unless indicated otherwise, all polymerization activities (also referred to as productivities) presently disclosed were determined as a ratio of polymer produced to the amount of catalyst added to the reactor and are reported in grams of polymer per grams of catalyst per hour (gPE/gcat/hr).

Comonomer Content

Unless indicated otherwise, all comonomer contents (i.e., the amount of comonomer incorporated into a polymer) presently disclosed were determined by rapid FT-IR spectroscopy on dissolved polymer in a Gel Permeation Chromatography (GPC) measurement and are reported in weight percent (wt. %). The comonomer content of a polymer can be determined with respect to polymer molecular weight by use of an infrared detector, such as an IR5 detector, in a GPC measurement, as described in Lee et al., *Toward absolute chemical composition distribution measurement of polyolefins by high-temperature liquid chromatography hyphenated with infrared absorbance and light scattering detectors,* 86 Anal. Chem. 8649 (2014).

High Load Melt Index ($I_{21}$)

Unless indicated otherwise, all high load melt indices ($I_{21}$) disclosed herein were measured according to ASTM D1238-10, Method B, at 190° C. and a 21.6 kg load, and are reported in decigrams per minute (dg/min).

Melt Temperature ($T_m$)

Unless indicated otherwise, all melt temperatures ($T_m$) disclosed herein were measured according to ASTM D3418-08 and are reported in degrees Celsius (° C.). Unless indicated otherwise, a scan rate of 10 degrees Celsius per minute (° C./min) on a 10 milligram (mg) sample was used, and the second heating cycle was used to determine the melt temperature ($T_m$).

Uptake Ratio

Unless indicated otherwise, all uptake ratios presently disclosed were determined as a ratio of an amount of monomer units derived from a comonomer (e.g., a ($C_3$-$C_{12}$) α-olefin comonomer) to an amount of monomer units derived from ethylene.

Molecular Weight

Unless indicated otherwise, all molecular weights disclosed herein, including weight average molecular weight ($M_w$), number average molecular weight ($M_n$), and z-average molecular weight ($M_z$), were measured using conventional GPC and are reported in grams per mole (g/mol).

The chromatographic system consisted of a High Temperature Gel Permeation Chromatography (Polymer Laboratories), equipped with a differential refractive index detector (DRI). Three Polymer Laboratories PLgel 10 μm Mixed-B columns were used. The nominal flow rate was 1.0 mL/min, and the nominal injection volume was 300 μL. The various transfer lines, columns, and differential refractometer (the DRI detector) were contained in an oven maintained at 160° C. The solvent for the experiment was prepared by dissolving 6 grams of butylated hydroxytoluene as an antioxidant in 4 liters of Aldrich reagent-grade 1,2,4-trichlorobenzene (TCB). The TCB mixture was then filtered through a 0.1 μm Teflon filter. The TCB was then degassed with an online degasser before entering the GPC instrument.

The polymer solutions were prepared by placing dry polymer in glass vials, adding the desired amount of TCB, then heating the mixture at 160° C. with continuous shaking for about 2 hours. All quantities were measured gravimetrically. The injection concentration was from 0.5 to 2.0 mg/ml, with lower concentrations being used for higher molecular weight samples. Prior to running each sample the DRI detector was purged. The flow rate in the apparatus was then increased to 1.0 ml/minute, and the DRI was allowed to stabilize for 8 hours before injecting the first sample. The molecular weight was determined by combining universal calibration relationship with the column calibration which is performed with a series of monodispersed polystyrene (PS) standards. The MW was calculated at each elution volume with following equation:

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, $a_{PS}$=0.67 and $K_{PS}$=0.000175, while $a_X$ and $K_X$ were obtained from published literature. Specifically, a/K=0.695/0.000579 for PE and 0.705/0.0002288 for PP.

The concentration, c, at each point in the chromatogram was calculated from the baseline-subtracted DRI signal, IDRI, using the following equation:

$$c = \frac{KDRI \times IDRI}{dn/dc}$$

where KDRI is a constant determined by calibrating the DRI, and (dn/dc) is the refractive index increment for the system. Specifically, dn/dc=0.109 for polyethylene.

The mass recovery was calculated from the ratio of the integrated area of the concentration chromatography over elution volume and the injection mass which is equal to the pre-determined concentration multiplied by injection loop volume.

Light-Off Batch Reactor Test Method.

General. Observe ethylene uptake, or ethylene consumption, catalyst systems in separate polymerization runs each done in a 2-liter (L) semi-batch autoclave polymerization reactor equipped with a mechanical agitator. In the batch reactor, copolymerize ethylene and 1-hexene in the presence of hydrogen ($H_2$) in the gas phase. Analyze concentrations of ethylene ("$C_2$"), 1-hexene ("$C_6$"), and $H_2$ in the gas phase by mass spectrometry and gas chromatography. Add $C_6$ and $H_2$ components continuously throughout a 3-hour polymerization run to maintain their concentrations at steady state, but do not add more $C_2$. Measure ethylene uptake versus time to give relative representations of catalyst kinetic profiles.

Batch reactor drying and loading. Prior to each run, dry the batch reactor for 1 hour. Then charge the dried batch reactor with 200 g NaCl. Further dry the batch reactor by heating it and its contents for 30 minutes under $N_2$ atmosphere at 100° C. Then, add 3 g of spray-dried silica-supported methylaluminoxane (SDMAO) to scavenge residuals, seal the batch reactor, and stir contents. Then charge the resulting dried batch reactor with 3.04 liters (L) of $H_2$ and 1-hexene so as to give a 1-hexene-to-ethylene ($C_6/C_2$) molar ratio of 0.004. Pressurize the batch reactor with ethylene to 1.52 megapascals (MPa). Allow the resulting system to reach steady state.

Then charge the batch reactor with a catalyst system to initiate polymerization. Record the time of addition of catalyst as Time zero ($Time_0$). Bring reactor temperature to the target temperature (typically from 80 to 100° C.) and maintain it at that temperature for from 1 to 5 hours. Cool the reactor down, vent, open, and wash the resulting polyolefin product with water, methanol, and dry it to give dried polyolefin product.

For each batch reactor run, calculate catalyst activity/polymerization productivity as number of grams dried polyolefin product made per gram of catalyst added to reactor-hour (gPE/gcat-hr). The higher the number of gPE/gcat-hr, the higher the catalyst activity/polymerization productivity. The ethylene uptake is measure throughout the course of the run and the total ethylene uptake at any time during the reaction can be determined by formula (VI):

$$\sum_{t=0}^{t} C2(t) \qquad \text{(VI)}$$

and the total ethylene uptake over the course of the run is given by formula (V):

$$\sum_{t=0}^{t_R} C2(t) \qquad \text{(V)}$$

Comparing two catalyst systems, all things being equal, the uptake ratio at a given time, Ut, is greater for a catalyst with a more rapid light-off will have a larger value than the $U_t$ for a catalyst system with a less rapid light-off.

EXAMPLES

Synthesis of Metal-Ligand Complex 1 (MLC-1)

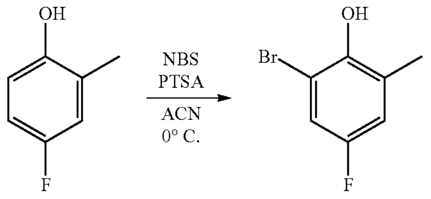

A glass bottle (1 liter (L)) was charged with acetonitrile (400 mL), 4-fluoro-6-methyl-phenol (50 g, 396.4 mmol), and p-toluenesulfonic acid (monohydrate; 75.6 g, 396 mmol). The resulting solution was cooled to 0° C. for 25 minutes, slowly treated with N-bromosuccinimide (70.55 g, 396.4 mmol) over the course of approximately 5 minutes, and allowed to reach room temperature while stirring overnight. The volatiles were removed under vacuum, and the resulting precipitate was treated with dichloromethane (600 mL), cooled to 0° C., and filtered through a large plug of silica gel, which was subsequently washed several times with cold dichloromethane ($CH_2Cl_2$). The volatiles were removed under vacuum to provide 2-bromo-4-fluoro-6-methyl-phenol (46 g, yield: 56%).

$^1$H NMR (400 MHz, Chloroform-d) δ 7.05 (ddd, J=7.7, 3.0, 0.7 Hz, 1H), 6.83 (ddt, J=8.7, 3.0, 0.8 Hz, 1H), 5.35 (s, 1H), 2.29 (d, J=0.7 Hz, 3H).

$^{19}$F NMR (376 MHz, Chloroform-d) δ −122.84.

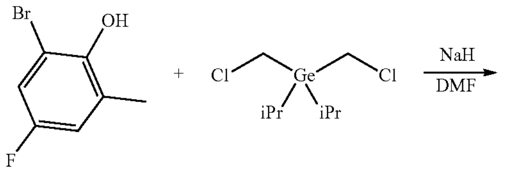

-continued

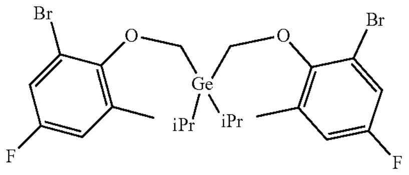

In a glovebox, in a flask (250 mL) equipped with a magnetic stir bar, NaH (95%; 1.76 g) was slowly added to a solution of 2-bromo-4-fluoro-6-methyl-phenol (15 g, 73.2 mmol) in N,N-dimethylformamide (DMF; 35 mL) until hydrogen evolution ceased. The resulting mixture was stirred for 30 minutes at room temperature. After this time, diisopropyl germyl dichloride (6.29 g, 24.4 mmol) was added. The mixture was warmed to 55° C. and held at this temperature for 18 hours before being removed from the glove box and quenched with saturated aqueous ammonium chloride ($NH_4Cl$; 20 mL) and water ($H_2O$; 8 mL). Diethyl ether ($Et_2O$; 30 mL) was added to the mixture, which was transferred to a separatory funnel to separate the resulting phases. The aqueous phase was further extracted with $Et_2O$ (20 mL), and the combined organic extracts were washed with brine (10 mL). The organic layer was then dried ($MgSO_4$), filtered, and concentrated to dryness. The crude residue was dry loaded onto silica gel and then purified using flash column chromatography (100 mL/min, pure hexanes with ethyl acetate ramping to 10% over 20 minutes) to afford the product as a pale-yellow oil. All clean fractions (some fractions contained <10% of starting phenol) were combined, and the final product was dried under vacuum overnight, which provided bis((2-bromo-4-fluoro-6-methylphenoxy)methyl)diisopropylgermane (9 g, yield: 62%). [0116] $^1$H NMR (400 MHz, Chloroform-d) δ 7.10 (dd, J=7.7, 3.0 Hz, 2H), 6.84 (ddd, J=8.8, 3.1, 0.8 Hz, 2H), 4.14 (s, 4H), 2.33 (s, 6H), 1.74 (hept, J=7.4 Hz, 2H), 1.35 (d, J=7.4 Hz, 12H).

$^{19}$F NMR (376 MHz, Chloroform-d) 8-118.03.

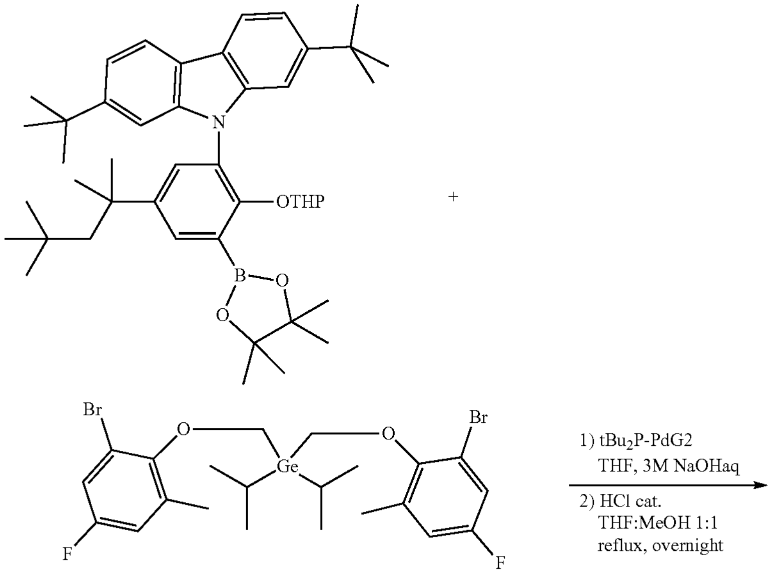

-continued

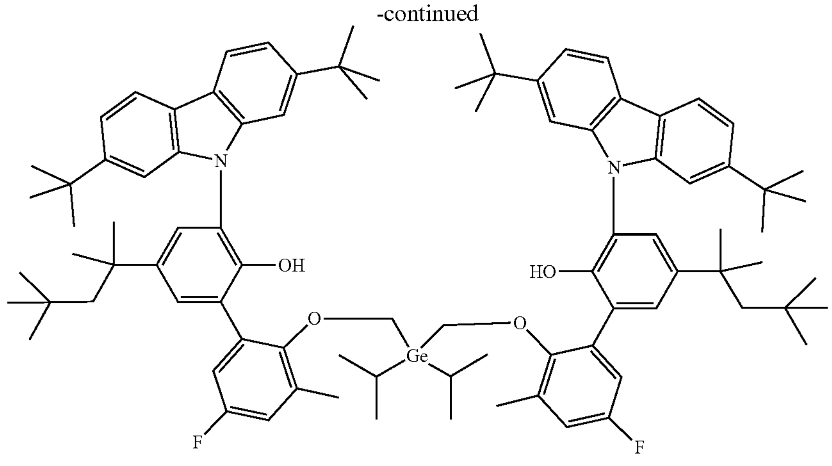

A glass-bottle (500 mL), equipped with a stir bar, was charged with 2,7-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (as described in International Publication No. WO 2014/105411 A1; 29.0 g, 41.9 mmol), bis((2-bromo-4-fluoro-6-methylphenoxy)methyl)diisopropylgermane (6.00 g, 8.65 mmol, contains 10% 2-bromo-4-fluoro-2-methyl-phenol), and THF (80 mL). The solution was heated to 55° C. and, while stirring, was treated with chloro[(tri-tert-butylphosphine)-2-(2-aminobiphenyl)]palladium (II) ($tBu_3P$-PdG2; 199 mg, 0.346 mmol, 4 mol %). An aqueous solution of NaOH (17.3 mL, 51.9 mmol, 3M) was purged with nitrogen for 20 minutes, and then added to the THF solution. The reaction was stirred overnight at 55° C. The aqueous phase was separated and discarded, and the remaining organic phase was diluted with diethyl ether and washed with brine twice. The solution was passed through a short plug of silica gel. The filtrate was dried on a rotary evaporator, dissolved in THF/methanol (40 mL/40 mL), treated with HCl (2 mL), and stirred overnight at 70° C. The solution was dried under vacuum, and purified by C18 reverse-phase column chromatography to provide a ligand (6.5 g, yield: 54%) as an off-white solid.

$^1$H NMR (400 MHz, Chloroform-d) δ 8.01 (d, J=8.2 Hz, 4H), 7.42 (dd, J=25.5, 2.4 Hz, 4H), 7.32 (dd, J=8.2, 1.6 Hz, 4H), 7.17 (s, 4H), 6.87 (ddd, J=16.4, 8.8, 3.0 Hz, 4H), 6.18 (s, 2H), 3.79 (s, 4H), 2.12 (s, 6H), 1.71 (s, 6H), 1.56 (s, 4H), 1.38 (s, 12H), 1.31 (s, 36H), 0.83-0.73 (m, 30H).

$^{19}$F NMR (376 MHz, Chloroform-d) δ-119.02.

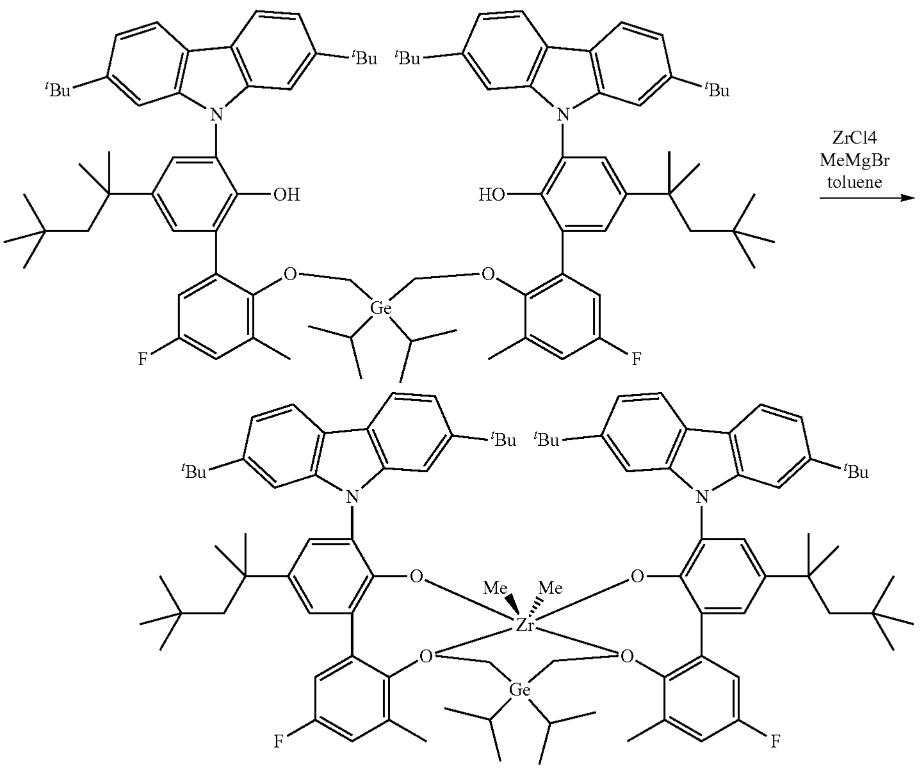

In a glovebox, MeMgBr in diethyl ether (3 M, 2.4 mL, 7.1 mmol) was added to a −30° C. suspension of $ZrCl_4$ (402 mg, 1.72 mmol) in anhydrous toluene (83 mL). After stirring the resulting mixture for 3 minutes, the ligand (2.3 g, 1.64 mmol) was added portion wise. The reaction was stirred overnight at room temperature, and then filtered through a fritted plastic funnel. The filtrate was dried under vacuum, re-dissolved in toluene (40 mL), filtered again through a plug of CELITE, and dried again under vacuum. The resulting solid was washed with pentane (approximately 5 mL) and dried under vacuum, which provided a metal-ligand complex (2.1 g, yield: 84%) as an off-white powder.

$^1H$ NMR (400 MHz, Benzene-$d_6$) δ 8.20 (dd, J=8.2, 0.5 Hz, 2H), 8.11 (dd, J=8.2, 0.6 Hz, 2H), 7.88-7.82 (m, 4H), 7.77 (d, J=2.6 Hz, 2H), 7.50 (dd, J=8.3, 1.7 Hz, 2H), 7.42-7.37 (m, 4H), 6.99 (dd, J=8.7, 3.1 Hz, 2H), 6.20-6.10 (m, 2H), 4.29 (d, J=12.2 Hz, 2H), 3.90 (d, J=12.2 Hz, 2H), 1.56 (s, 4H), 1.53 (s, 18H), 1.29 (s, 24H), 1.27 (s, 6H), 1.18 (s, 6H), 1.04-0.94 (m, 2H), 0.81 (d, J=7.4 Hz, 6H), 0.80 (s, 18H), 0.74 (d, J=7.4 Hz, 6H), −0.47 (s, 6H).

$^{19}F$ NMR (376 MHz, Benzene-$d_6$) δ −116.24.

Synthesis of Metal-Ligand Complex 2 (MLC-2)

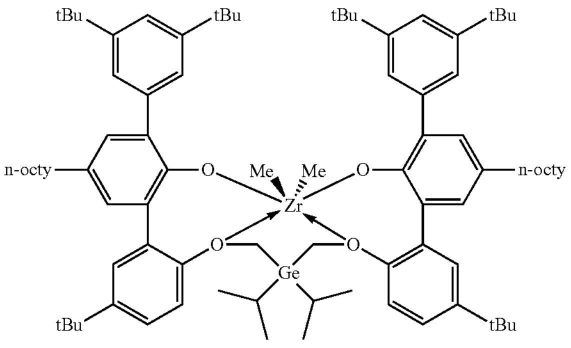

The metal-ligand complex was synthesized in the manner described in International Publication No. WO 2018/183056 A1.

$^1H$ NMR (400 MHz, $C_6D_6$) δ 8.04 (br s, 2H), 7.76 (t, J=1.9 Hz, 2H), 7.61 (br s, 2H), 7.43 (t, J=2.8 Hz, 2H), 7.34 (d, J=2.4 Hz, 2H), 7.08 (t, J=8.8 Hz, 2H), 5.50 (dd, J=8.8, 1.1 Hz, 2H), 4.75 (d, J=11.5 Hz, 2H), 3.69 (d, J=11.4 Hz, 2H), 2.69-2.49 (m, 4H), 1.71-1.60 (m, 4H), 1.58-1.19 (m, 74H), 0.96-0.87 (m, 6H), 0.73-0.57 (m, 14H), −0.04 (s, 6H). $^{19}F\{1H\}$NMR (376 MHz, $C_6D6$) 8-108.63 (m, 2F).

Preparation of Catalyst System 1

In a nitrogen-purged glovebox, 0.80 grams of hydrophobic fumed silica (commercially available as CAB-O-SIL® TS-610 from Cabot Corporation) was added to 20.0 grams of toluene and mixed until well dispersed to produce a slurry. Next, 6.60 grams of methylaluminoxane (10 wt. % in toluene) was added to the slurry, stirred for 15 minutes, and 0.043 grams of MLC-1 was added to the resulting mixture, which was then stirred for an additional 30 to 60 minutes. The mixture was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm to produce Catalyst System 1 (Cat. Sys. 1).

Preparation of Catalyst System 2

In a nitrogen-purged glovebox, 0.68 grams of hydrophobic fumed silica (commercially available as CAB-O-SIL® TS-610 from Cabot Corporation) was added to 20.0 grams of toluene and mixed until well dispersed to produce a slurry. Next, 9.05 grams of methylaluminoxane (10 wt. % in toluene) was added to the slurry, stirred for 15 minutes, and 0.046 grams of MLC-1 was added to the resulting mixture, which was then stirred for an additional 30 to 60 minutes. The mixture was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm to produce Catalyst System 2 (Cat. Sys. 2).

Preparation of Catalyst System 3

In a nitrogen-purged glovebox, 0.80 grams of hydrophobic fumed silica (commercially available as CAB-O-SIL® TS-610 from Cabot Corporation) was added to 20.0 grams of toluene and mixed until well dispersed to produce a slurry. Next, 6.98 grams of methylaluminoxane (10 wt. % in toluene) was added to the slurry, stirred for 15 minutes, and 0.091 grams of MLC-1 was added to the resulting mixture, which was then stirred for an additional 30 to 60 minutes. The mixture was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm to produce Catalyst System 1 (Cat. Sys. 3).

Preparation of Catalyst System 4

In a nitrogen-purged glovebox, 0.66 grams of hydrophobic fumed silica (commercially available as CAB-O-SIL® TS-610 from Cabot Corporation) was added to 37.5 grams of toluene and mixed until well dispersed to produce a slurry. Next, 5.90 grams of methylaluminoxane (10 wt. % in toluene) was added to the slurry, stirred for 15 minutes, and 0.074 grams of MLC-2 was added to the resulting mixture, which was then stirred for an additional 30 to 60 minutes. The mixture was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm to produce Catalyst System 4.

Preparation of Comparative Catalyst System C1

In a nitrogen-purged glovebox, 1.33 grams of hydrophobic fumed silica (commercially available as CAB-O-SIL® TS-610 from Cabot Corporation) was added to 37.5 grams of toluene and mixed until well dispersed to produce a slurry. Next, 11.00 grams of methylaluminoxane (10 wt. % in toluene) was added to the slurry, which was stirred for 15 minutes before adding 0.189 grams of a metal-ligand complex having the following structure:

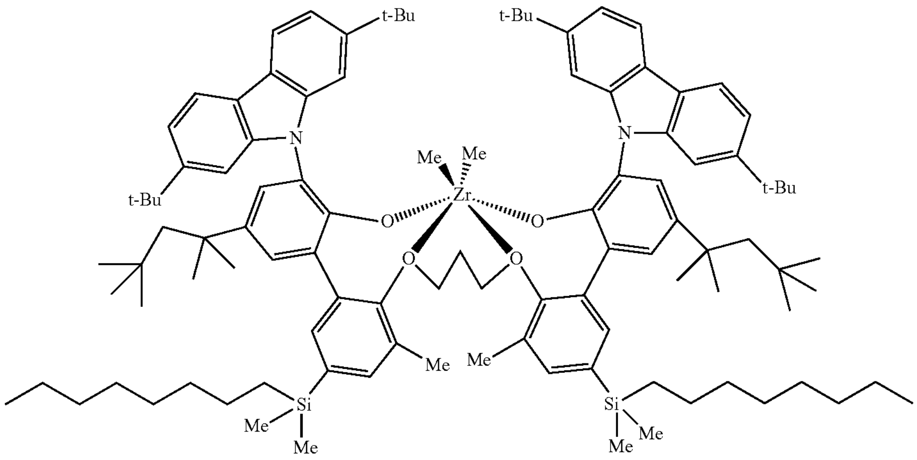

The mixture was then stirred for an additional 30 to 60 minutes. The mixture was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm to produce Comparative Catalyst System $C_1$ (Comp. Cat. C1).

Preparation of Comparative Catalyst System C2

In a nitrogen-purged glovebox, 2.65 grams of hydrophobic fumed silica (commercially available as CAB-O-SIL® TS-610 from Cabot Corporation) was added to 75.0 grams of toluene and mixed until well dispersed to produce a slurry. Next, 22.00 grams of methylaluminoxane (10 wt. % in toluene) was added to the slurry, which was stirred for 15 minutes before adding 0.155 grams of a metal-ligand complex having the following structure:

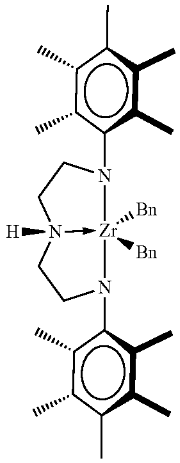

The mixture was then stirred for an additional 30 to 60 minutes. The mixture was then dried using a spray dryer (commercially available as Mini Spray Dryer B-290 from BUCHI Corporation) with an inlet temperature of 185° C., an outlet temperature of 100° C., an aspirator speed of 95 rotations per minute (rpm), and a pump speed of 150 rpm to produce Comparative Catalyst System 2 (Comp. Cat. C2).

Gas-Phase Batch Reactor Test:

The spray dried catalysts prepared above were used for ethylene/1-hexene copolymerizations conducted in the gas-phase in a 2 L semi-batch autoclave polymerization reactor. The individual run conditions and the properties of the polymers produced in these runs are tabulated in Tables 1 to 5.

Gas-phase batch reactor catalyst testing procedure: The gas phase reactor employed is a 2 liter, stainless steel autoclave equipped with a mechanical agitator. For the experimental runs, the reactor was first dried for 1 hour, charged with 200 g of NaCl and dried by heating at 100° C. under nitrogen for 30 minutes. After baking out the reactor, 3 g of SDMAO (spray-dried supported methylaluminoxane) was introduced as a scavenger under nitrogen pressure. After adding SDMAO, the reactor was sealed and components were stirred. The reactor was then charged with hydrogen and 1-hexene pressurized with ethylene. Once the system reached a steady state, the catalyst was charged into the reactor at 80° C. to start polymerization. The reactor temperature was brought to the desired reaction temperature and maintained at this temperature, and at the ethylene, 1-hexene, and hydrogen feed ratios throughout the 1 hour run. At the end of the run, the reactor was cooled down, vented and opened. The resulting product mixture was washed with water and methanol, then dried. Polymerization Activity (grams polymer/gram catalyst-hour) was determined as the ratio of polymer produced to the amount of catalyst added to the reactor.

TABLE 1

Batch reactor run data for Catalyst System 1 to 3 and comparative examples.

| Ex No | Catalyst | Cond. | Catalyst Charge (mg) | Copoly Yield (g) | Catalyst Productivity (gPE/gcat/h) | Efficiency MM (gPE/gM) | Target T (° C.) | Max. T (° C.) | Percent Exotherm $\%_{exo}$ % |
|---|---|---|---|---|---|---|---|---|---|
| 1 | Cat. Sys. 1 | 1a | 0.8 | 93.20 | 116,495 | 63.9 | 90 | 90.1 | 0.1% |
| 2 | Cat. Sys. 2 | 1a | 1.1 | 192.79 | 175,266 | 96.2 | 90 | 91.1 | 1.2% |

TABLE 1-continued

| Batch reactor run data for Catalyst System 1 to 3 and comparative examples. | | | | | | | | | | |
|---|---|---|---|---|---|---|---|---|---|---|
| Ex No | Catalyst | Cond. | Catalyst Charge (mg) | Copoly Yield (g) | Catalyst Productivity (gPE/gcat/h) | Efficiency MM (gPE/gM) | Target T (° C.) | Max. T (° C.) | Percent Exotherm $\%_{exo}$ % |
| 3 | Cat. Sys. 3 | 1a | 1.4 | 132.40 | 94,571 | 26.0 | 90 | 90.4 | 0.4% |
| 4 | Cat. Sys. 1 | 2a | 0.9 | 255.39 | 283,771 | 155.7 | 100 | 101.1 | 1.1% |
| 5 | Cat. Sys. 2 | 2a | 1.5 | 127.20 | 84,798 | 46.5 | 100 | 100.0 | 0.0% |
| 6 | Cat. Sys. 1 | 3 | 0.9 | 233.20 | 259,108 | 142.2 | 93 | 95.0 | 2.2% |
| 7 | Cat. Sys. 2 | 3 | 1.4 | 243.39 | 173,853 | 95.4 | 93 | 96.0 | 3.2% |
| 8 | Cat. Sys. 3 | 3 | 1 | 181.40 | 181,399 | 49.8 | 93 | 93.5 | 0.5% |
| 9 | Comp Cat C1 | 1b | 2.8 | 108.2 | 38,642 | 9.43 | 90 | 99.9 | 11.0% |
| 10 | Comp Cat C1 | 2b | 2.3 | 60.2 | 26,173 | 6.38 | 90 | 132.5 | 47.2% |
| 11 | Comp Cat C2 | 3* | 15.1 | 102.59 | 6,795 | 1.52 | 93 | 118.5 | 27.4% |

Condition 1a: injection T=80° C., run T=90° C., 0.003 C6/C2, 0.004 H2/C2, 100 psi C2, 1 hour run time. Condition 2a: injection T=80° C., run T=100° C., 0.004 C6/C2, 0.0068 H2/C2, 230 psi C2, 1 hour run time. Condition 3: injection T=80° C., run T=93° C., 0.0043 C6/C2, 0.004 H2/C2, 220 psi C2, 1 hour run time. Condition 1b: injection T=80° C., run T=90° C., 0.004 C6/C2, 0.0011 H2/C2, 115 psi C2, 1 hour run time. Condition 2b: injection T=80° C., run T=90° C., 0.004 C6/C2, 0.0011 H2/C2, 230 psi C2, 1 hour run time.

*Run time increased to 3 hours.

Rapid light-off causes operability issues due to rapid consumption of ethylene and/or comonomer leading to particle overheating, and perhaps is better quantified in terms of the internal reactor temperature ($T_{int}$), which is a measure of the heat of polymerization and an indirect measure of the catalyst particle temperature. $T_{int}$ is a convenient way of quantifying and comparing the severity of the light-off of different catalysts in semi-batch gas phase polymerization process.

C2 also overshoots the 93° C. target temperature by about 26° C. to 118.5° C. under condition 3*. The productivity of the germanium-bridged Catalyst System 1 to 3 is also significantly higher (Table 1).

The ethylene uptake curves for the Catalyst System 1 are shown in FIG. 1. These are examples 4 and 7 from Table 1. The productivity value for Example 4 is 283,771 gPE/gcat/h and for Example 7 is 259,108 gPE/gcat/h (or 155.7 MM gPE/gZr and 142.2 MM gPE/gZr, respectively in terms of efficiency). These runs experienced no operability issues such as chunking, which described above is caused by particle overheating and fusing together and is exasperated by catalysts having a rapid light-off. The productivity for this catalyst is far higher than any previous CARL batch reactor runs, and despite this the ethylene uptake curves show that the catalysts has a relatively gentle light-off and slow decay, which is more typical of a metallocene catalyst than a spray dried bis-phenylphenoxy (i.e. MCL-1, MCL-2 and MCL-C1) catalyst.

TABLE 2

| Batch reactor run data for Catalyst System 4 (Cat. Sys. 4) | | | | | | | | |
|---|---|---|---|---|---|---|---|---|
| Ex. No. | H2/C2 | C2PP (psi) | Catalyst Charge (mg) | Copolymer Yield (g) | Catalyst Productivity (gPE/gcat/h) | Efficiency MM (gPE/gM) | Target T (° C.) | Max. T (° C.) |
| 13 | 0.018 | 230 | 5.3 | 244.59 | 46150 | 12.6 | 90 | 90.4 |
| 14 | 0.01 | 230 | 5.2 | 254.39 | 48922 | 13.4 | 90 | 90.7 |
| 15 | 0.007 | 230 | 5 | 223.59 | 44718 | 12.3 | 90 | 91.9 |
| 16 | 0.004 | 230 | 5.1 | 251.20 | 49254 | 13.5 | 90 | 90.6 |
| 17 | 0.01 | 165 | 5.8 | 174.00 | 29999 | 8.2 | 90 | 91.6 |
| 18 | 0.01 | 100 | 5.1 | 78.91 | 15472 | 4.2 | 90 | 90.4 |
| 19 | 0.01 | 230 | 4.8 | 101.19 | 21081 | 5.8 | 105 | 105.1 |
| 20 | 0.01 | 230 | 1.9 | 111.57 | 58723 | 16.1 | 80 | 80.3 |

Conditions: injection T=80° C., 0 C6/C2, 1 hour run time.

Figure 2:
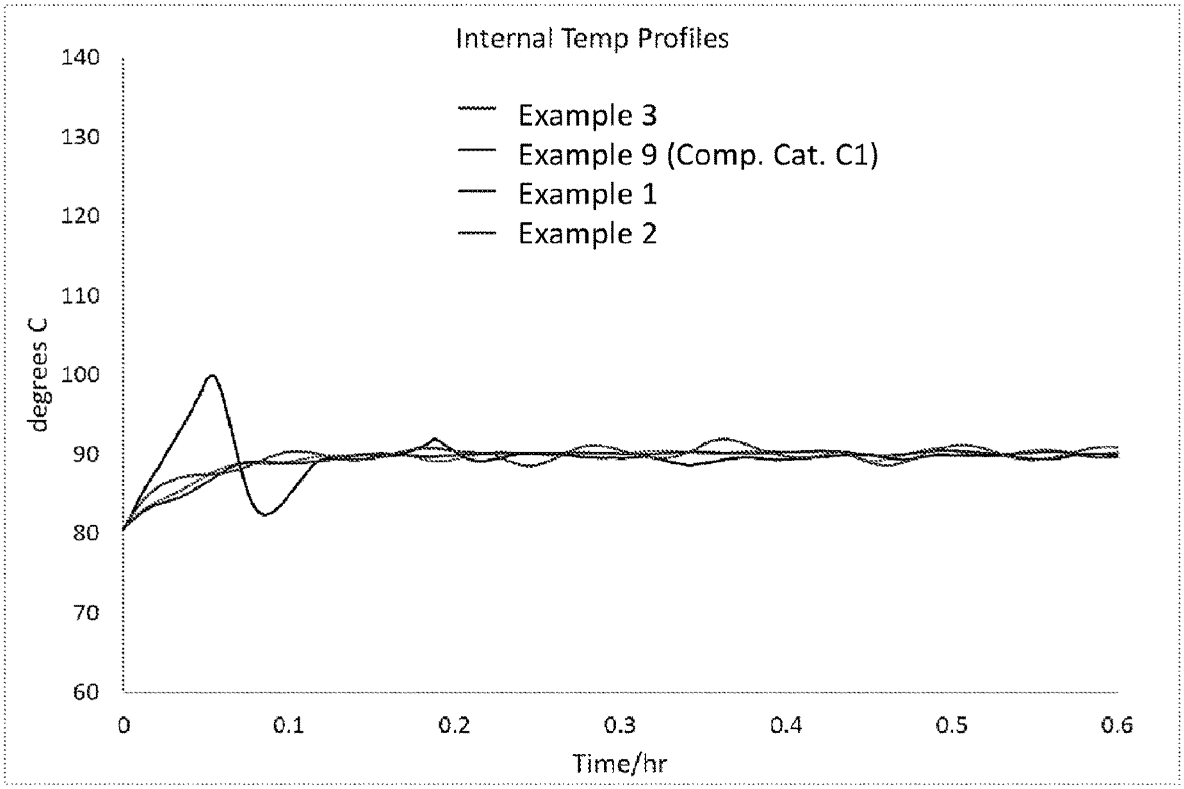
FIG. 2 is a graphical depiction of the reactor temperature profiles for examples 1 to 3.
Figure 3:
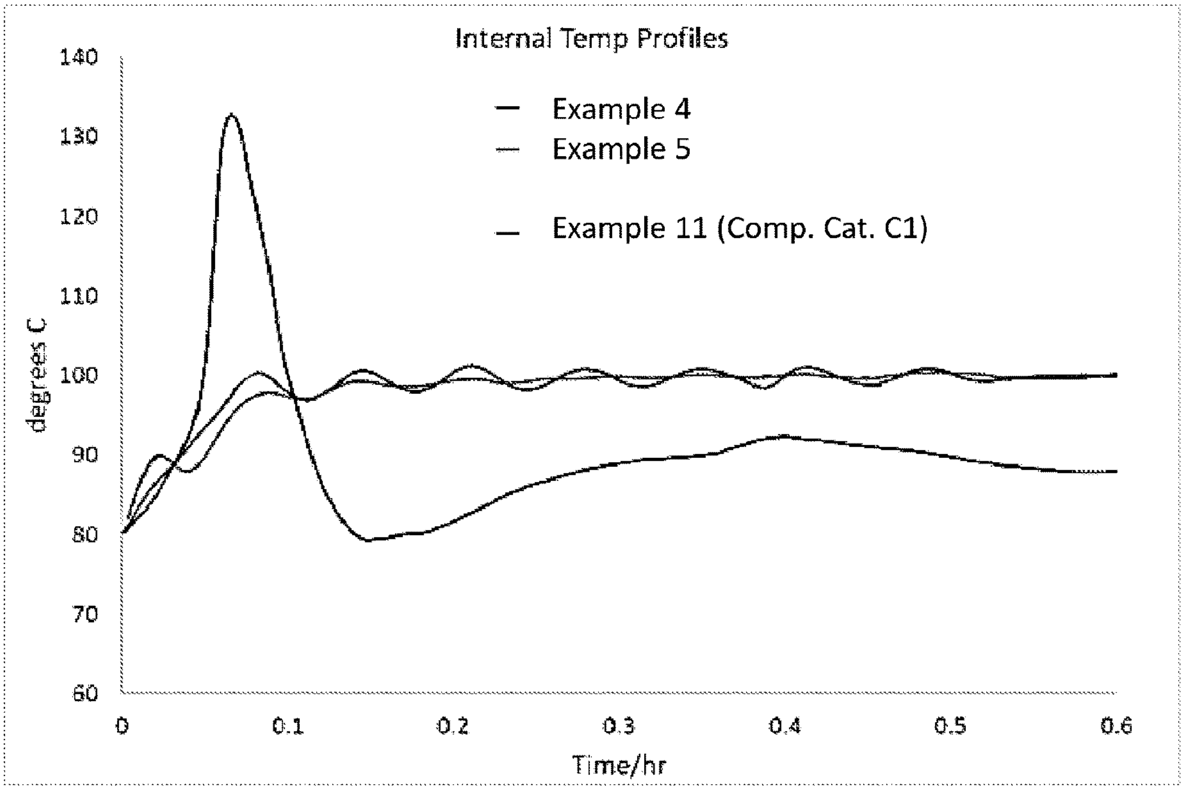
FIG. 3 is a graphical depiction of the reactor temperature profiles for examples 4 to 6, in which the polymerization reaction was run under condition 2b.

In FIG. 2, the internal temperature profiles of examples 1-3 (Catalyst System 1 to 3) under condition 1a and the comparative example 10 (Comparative Catalyst System C1) under condition 1b. In each example the catalyst is injected at 80° C. and then the temperature is quickly increased to the target temperature of 90° C. In the three runs for the Catalyst System 1 to 3 in FIG. 2 the maximum temperature does not exceed the target temperature (Table 1). In the comparative example with Comparative Catalyst System C1 the $T_{int}$ overshoots the 90° C. target temperature by about 10° C. to 99.9° C. Also, Comparative Catalyst System C1 also overshoots the 90° C. target temperature by about 43° C. to 132.5° C. under condition 2b. Comparative Catalyst System The internal temperature profiles of examples 4-6 (Catalyst Systems 1 to 3) under condition 2a and the comparative example 11 (Comparative Catalyst C1) under condition 2b are shown in FIG. 3. Catalyst System 1 does not overshoot the target temperature of 100° C., despite both having incredibly high productivity (as recorded in Table 1). The Catalyst System does overshoot the target temperature by about 8° C. However, the temperature does take approx. 6 minutes to reach the 108.1° *C. maximum* for the run. Since the Comparative Catalyst C1 often suffers from serious chunking problems caused by overheating at economical advantaged operating ethylene partial pressures (approx.

200 psi C2PP), the conditions for the comparative example 11 of Comparative Catalyst C1 was targeted at a temperature of 90° C. In example 11 of Table 1, Comparative Catalyst C1 overshoots the target temperature by 42.5° C. (max T=132.5° C.).

decay rate of the catalyst increases significantly at 115° C. A catalyst with high productivity accompanied by a gradual light-off and temperature accelerated decay is a very promising candidate for well-behaved operation in a gas phase polyethylene process.

TABLE 3

Batch reactor run data for Catalyst System 4.

| Ex. No. | H2/C2 | C2PP (psi) | Catalyst Charge (mg) | Copoly Yield (g) | Catalyst Productivity (gPE/gcat/h) | Efficiency MM (gPE/gM) | Target T (° C.) | Max. T (° C.) | Percent Exotherm $\%_{exo}$ % |
|---|---|---|---|---|---|---|---|---|---|
| 13 | 0.018 | 230 | 5.3 | 244.59 | 46,150 | 12.6 | 90 | 90.4 | 0.4% |
| 14 | 0.01 | 230 | 5.2 | 254.39 | 48,922 | 13.4 | 90 | 90.7 | 0.8% |
| 15 | 0.007 | 230 | 5 | 223.59 | 44,718 | 12.3 | 90 | 91.9 | 2.1% |
| 16 | 0.004 | 230 | 5.1 | 251.20 | 49,254 | 13.5 | 90 | 90.6 | 0.7% |
| 17 | 0.01 | 165 | 5.8 | 174.00 | 29,999 | 8.2 | 90 | 91.6 | 1.8% |
| 18 | 0.01 | 100 | 5.1 | 78.91 | 15,472 | 4.2 | 90 | 90.4 | 0.4% |
| 19 | 0.01 | 230 | 4.8 | 101.19 | 21,081 | 5.8 | 105 | 105.1 | 0.1% |
| 20 | 0.01 | 230 | 1.9 | 111.57 | 58,723 | 16.1 | 80 | 80.3 | 0.4% |

In each of the examples in Table 1, the catalyst system was injected at 80° C., and the temperature was quickly increased to the target temperature of 90° C. In the three runs for the Catalyst System 1 in FIG. 3 the maximum temperature does not exceed the target temperature (Table 1). In the comparative example with Comparative Catalyst C1 the $T_{int}$ overshoots the 90° C. target temperature by about 10° C. to 99.9° C. The productivity of the germanium bridged Catalyst System 1 to 3 was also significantly higher in Table 2. The productivity (and efficiency of the germanium bridged Catalyst System 1 to 3 examples are much higher than the comparative Catalyst System which had a three-carbon bridge.

Figure 4:
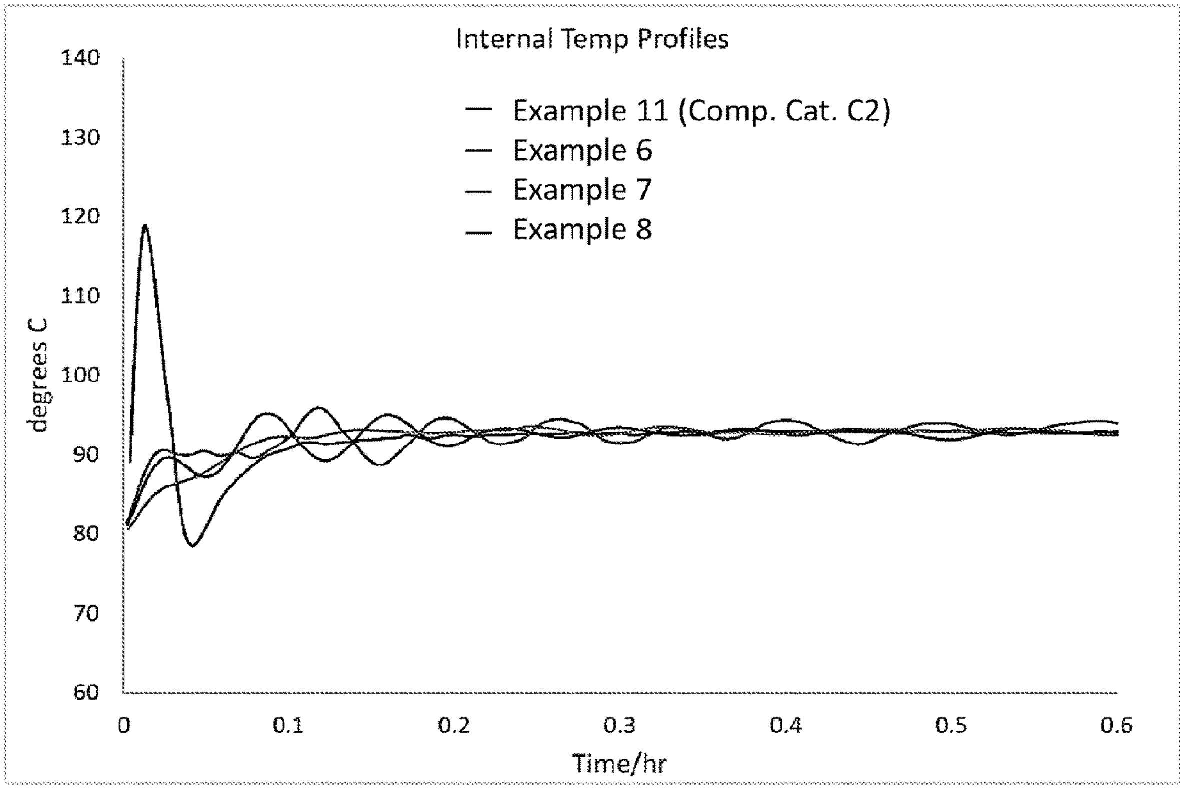
FIG. 4 is a graphical depiction of the reactor temperature profiles for examples 7 to 9, in which the polymerization reaction was run under condition 3.
Figure 5:
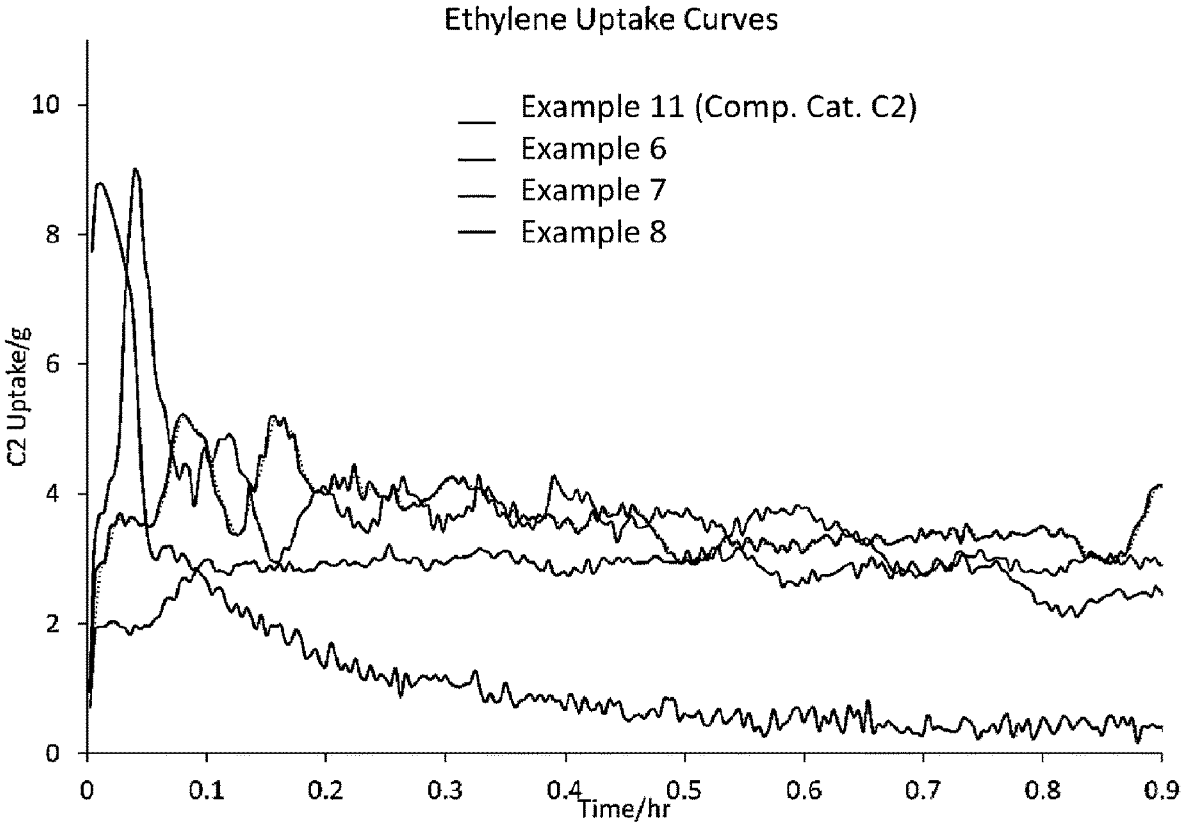
FIG. 5 is an ethylene uptake curve for Examples 7 and 9 in which the polymerization reaction was run under condition 3.

The Catalyst Systems 1 to 3 were also tested under condition 3 and compered to comparative catalyst 2, which is used in several different commercial catalyst systems. The internal temperature profiles of runs 7-9 with Catalyst System 1A and the comparative run 12 with Comparative Catalyst C2 are shown in FIG. 4. Despite being a high C2PP condition with 230 psi ethylene, none of the examples with MLC-1 exhibit reactor overeating, with the maximum temperature recorded being only 3° C. above the target temperature of 93° C. (as recorded in Table 1). In contrast, Comparative Catalyst C2 does exhibit a rapid light-off with a maximum temperature of 118.5° C. The productivity of Catalyst Systems 1 to 3 in runs is up to two orders of magnitude higher than Comparative Catalyst C2 despite the more controlled light-off. Additionally, the ethylene uptake curves (FIG. 5) show that the Catalyst Systems 1 to 3 would have a much high productivity over a three hour residence time, which is standard for gas-phase polymerization processes.

Figure 6:
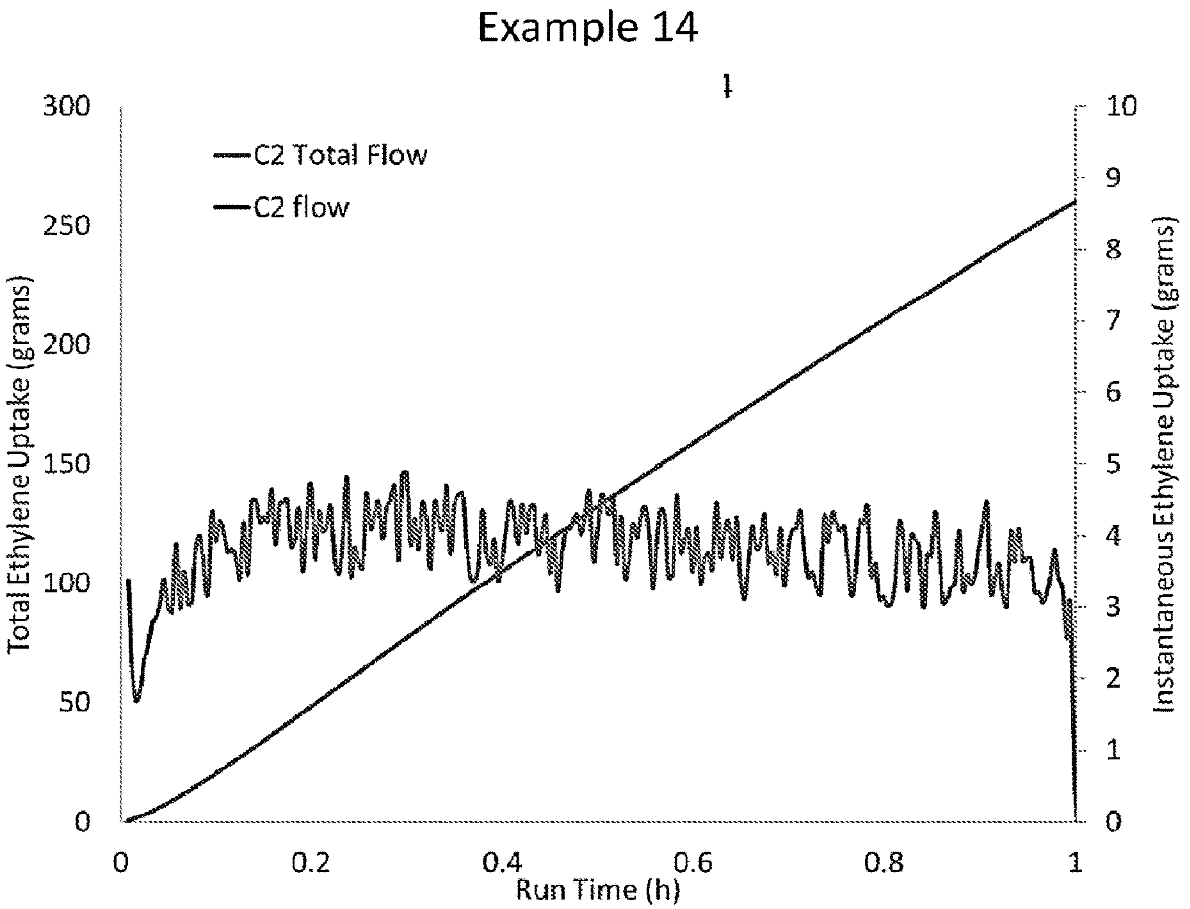
FIG. 6 is a graphical depiction of the ethylene and the total ethylene uptake curves for Catalysts System 2 in example 14.
Figure 7:
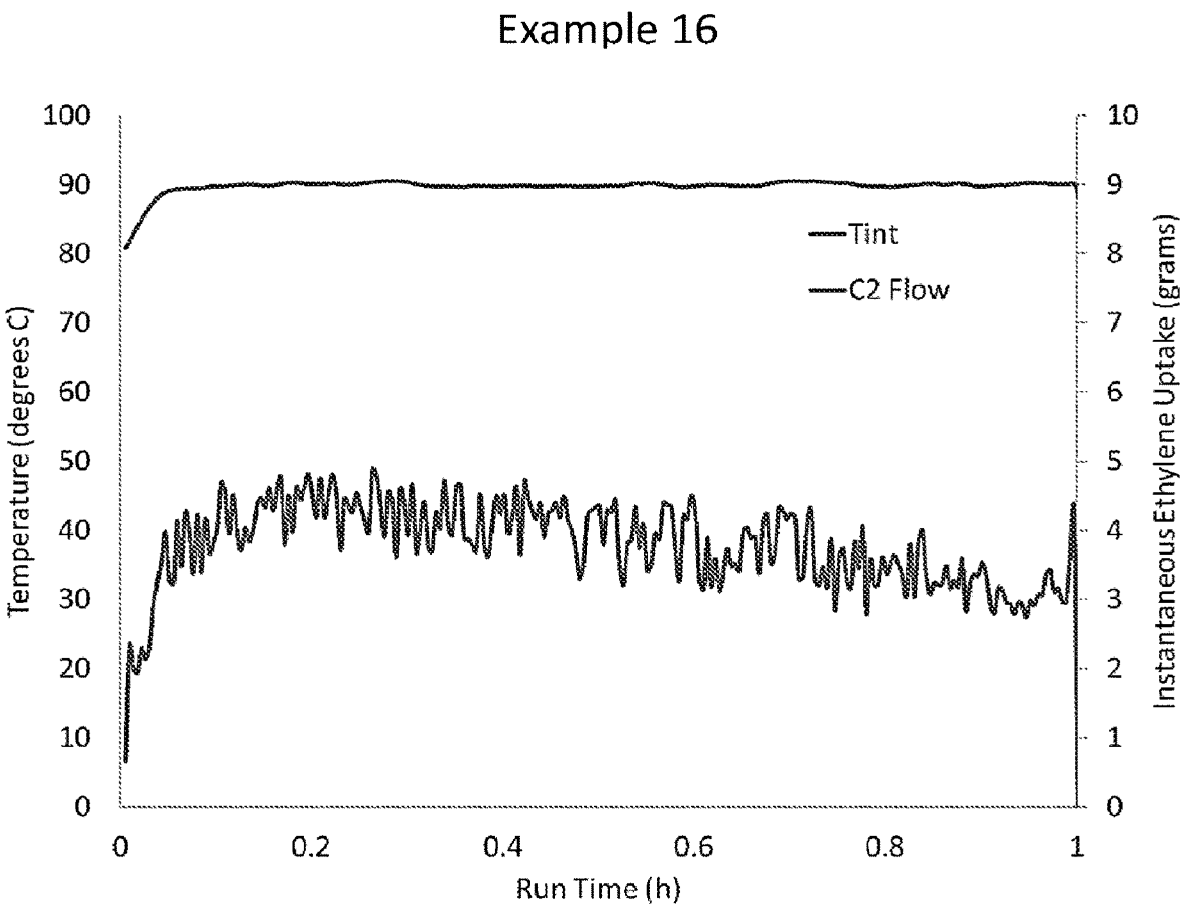
FIG. 7 is an ethylene uptake curve and internal reactor profile for Catalyst System 2 in example 16.
Figure 8:
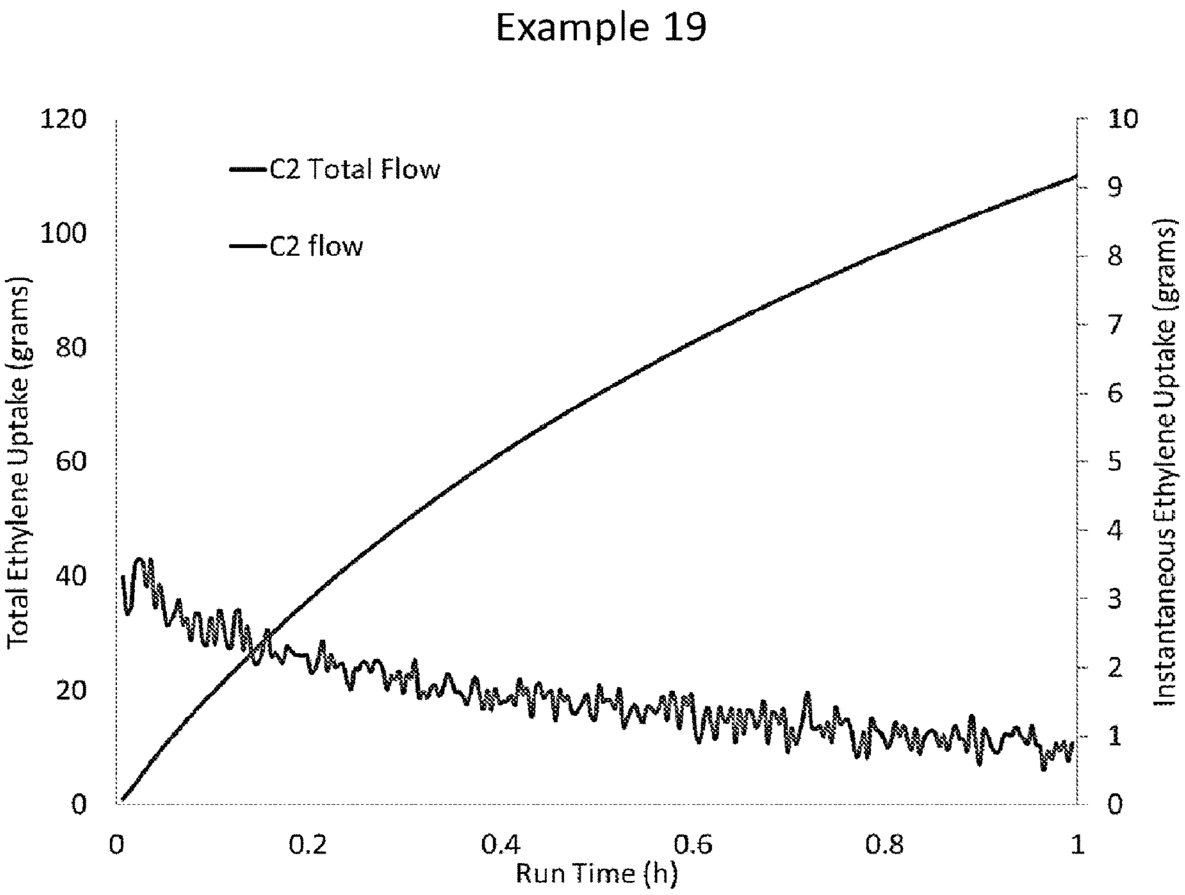
FIG. 8 is a graphical depiction of the ethylene and the total ethylene uptake curves for Catalysts System 2 in example 19.

Examples 13-20 in Table 2 using this catalyst all show very high productivities, from approximately 45,000 to 60,000 gPE/gcat/h at high C2PP (230 psi C2). Even at lower C2PP the productivity remains relatively high. While not as high as examples using Catalyst Systems 1 to 3, these are unprecedentedly high productivity for a good incorporating catalyst of any kind (metallocene, post-metallocene). The ethylene uptake curves in FIGS. 6-8 show gradual light-offs and long catalyst lifetimes more generally associated with a well-behaved metallocene catalyst at low C2PP. The internal temperature profile in FIG. 7 for example 16 is representative of all the runs in Table 2. The decay of the ethylene uptake profiles is very slow, but in FIG. 8, example 19, the Conditions: injection T=80° C., 0 C6/C2, 1 hour run time.

The light-off, or initial exotherm and total ethylene uptake within the first 5%, or first 3 minutes of a 1 hour run, can also be quantified to assess the operability of catalysts. The measured exotherm as well as the percent of the total ethylene uptakes at different time points within the first 3 minutes of several batch experiments is presented in Table 5 for Catalyst Systems 1 to 4, as well as Comparative Catalyst C1 and Comparative Catalyst C2. The exotherm is calculated using Equation 1 below, where $T_{int}$ is the internal temperature measured on the thermocouple in the reactor and the Set $T_{rx}$ is the set reactor temperature for the experiment. The percent of the total ethylene uptake is calculated using Equation 2 below; where C2 $\text{Uptake}_{Time}$ is the total ethylene consumed at that specific time of the experiment, and C2 $\text{Uptake}_{Whole}$ is the total ethylene consumed for the entire run (1 hour or 3 hours).

$$\text{Exotherm} = \text{Max } T_{int} - \text{Set } T_{rx} \qquad \text{Equation 1}$$

Equation 2

$$\%\ C2\ \text{Uptake}_{Time} = (C2\ \text{Uptake}_{Time}/\text{Total } C2\ \text{Uptake}_{Whole}) * 100\%$$

The light-off, or ethylene uptake profile, of the catalyst system may be characterized by the percent exotherm ($\%_{Exo}$), conveniently measured by the batch reactor test method and quantified as the difference in the maximum reactor temperature ($T_{max}$) and target reactor temperature ($T_{rx}$) temperature over $T_{rx}$ as a percent, given by formula (XII):

$$\text{Percent Exotherm } (\%_{Exo}) = \frac{T_{max} - T_{rx}}{T_{rx}} \times 100\% \qquad \text{Formula (XII)}$$

The percent exotherms are best compared at similar ethylene partial pressure ranges. At an ethylene partial pressure of less than 150 psi, a catalyst system with a gentle light-off that has no signs of operability issues can be characterized as having a percent exotherm ($\%_{exo}$) less than 5%. For instance, examples 1-3 and 18 all have $\%_{exo}$<2.0% while the comparative example has a $\%_{exo}$ of 11.0%. For operating reactors with ethylene partial pressures above 150 psi, a gentle light-off catalyst system that has no signs of operability issues can be characterized as having a percent exotherm ($\%_{exo}$) less than 10%. For instance, examples 4-9, 13-17, and 19-20, the $\%_{exo}$ is less than 40, while comparative examples 11 and 12 have $\%_{exo}$ of 47.2 and 27.4%, respectively.

Consistently lower exotherms are observed for Catalyst Systems 1 to 4 (≤8° C.) compared to the comparative examples, which have significantly higher exotherms (≥17° C.) upon initial catalyst injections under conditions with high ethylene partial pressures (Table 4). Catalyst Systems 1 to 4 also exhibit significantly lower total ethylene uptake at various time points within the first 3 minutes under various conditions with both low and high C2PP compared to Comparative Catalyst C and Comparative Catalyst C2 (Table 4, No. 1-17 vs. 18-24). The significantly lower exotherms and initial ethylene uptakes, or light-offs, for Catalyst Systems 1 to 4 illustrate evidence that these catalysts have improved light-offs, and therefore improved operability, compared to the comparative examples, Comparative Catalyst C1 and Comparative Catalyst C2.

TABLE 4

Percent of total ethylene uptake at time points within initial 3 mins for Catalyst Systems 1 to 4 and comparative examples.

| No. | Catalyst | Cond. | Exotherm (° C.) | Uptake at 30 secs. (%) | Uptake at 1 min. (%) | Uptake at 90 secs. (%) | Uptake at 2 min. (%) | Uptake at 3 min. (%) |
|---|---|---|---|---|---|---|---|---|
| 1 | Cat. Sys 1 | 1a | 0 | 0.6 | 1.3 | 2.0 | 2.5 | 3.6 |
| 2 | Cat. Sys 2 | 1a | 3 | 0.6 | 1.2 | 1.8 | 2.4 | 3.6 |
| 3 | Cat. Sys 3 | 1a | 1 | 0.6 | 1.1 | 1.7 | 2.2 | 3.3 |
| 4 | Cat. Sys 1 | 2a | 1 | 0.3 | 0.9 | 1.4 | 2.1 | 3.5 |
| 5 | Cat. Sys 2 | 2a | 8 | 1.5 | 2.8 | 4.4 | 6.3 | 13.3 |
| 6 | Cat. Sys 3 | 2a | 1 | 1.2 | 3.7 | 6.5 | 8.7 | 12.2 |
| 7 | Cat. Sys 1 | 3 | 6 | 1.1 | 1.8 | 2.6 | 3.5 | 5.2 |
| 8 | Cat. Sys 2 | 3 | 1 | 0.6 | 1.2 | 1.8 | 2.4 | 3.6 |
| 9 | Cat. Sys 3 | 3 | 8 | 0.9 | 1.8 | 2.9 | 4.4 | 8.2 |
| 10 | Cat. Sys 4 | 4 | 0 | 0.5 | 0.9 | 1.5 | 2.1 | 3.5 |
| 11 | Cat. Sys 4 | 5 | 1 | 0.5 | 0.8 | 1.3 | 2.0 | 3.4 |
| 12 | Cat. Sys 4 | 6 | 2 | 0.4 | 0.9 | 1.3 | 2.0 | 3.5 |
| 13 | Cat. Sys 4 | 7 | 1 | 0.3 | 0.7 | 1.2 | 1.8 | 3.3 |
| 14 | Cat. Sys 4 | 8 | 2 | 0.3 | 1.0 | 1.4 | 2.0 | 3.3 |
| 15 | Cat. Sys 4 | 9 | 0 | 0.0 | 0.1 | 0.9 | 1.8 | 2.9 |
| 16 | Cat. Sys 4 | 10 | 0 | 1.5 | 3.2 | 4.9 | 6.6 | 9.7 |
| 17 | Cat. Sys 4 | 11 | 0 | 0.7 | 1.0 | 1.3 | 1.7 | 2.7 |
| Comparative Examples | | | | | | | | |
| 18 | Comp Cat C1 | 1b | 10 | 0.4 | 1.3 | 2.8 | 4.8 | 10.4 |
| 19 | Comp Cat C1 | 1c | 42 | 1.2 | 2.9 | 5.2 | 8.0 | 15.7 |
| 20 | Comp Cat C1 | 2a | 17 | 13.2 | 21.4 | 29.8 | 34.2 | 34.5 |
| 21 | Comp Cat C1 | 2b | 26 | 8.2 | 16.2 | 24.3 | 32.4 | 41.8 |
| 22 | Comp Cat C2 | 3* | 26 | 5.1 | 9.6 | 13.9 | 17.7 | 22.5 |
| 23 | Comp Cat C2 | 2a | 17 | 3.8 | 13.1 | 22.3 | 29.0 | 36.2 |
| 24 | Comp Cat C2 | 2b | 19 | 2.4 | 7.2 | 12.0 | 17.0 | 26.3 |

Condition 1a: injection T=80° C., run T=90° C., 0.003 C6/C2, 0.004 H2/C2, 100 psi C2, 1 hour run time. Condition 1b: injection T=80° C., run T=90° C., 0.004 C6/C2, 0.0011 H2/C2, 115 psi C2, 1 hour. Condition 1c: injection T=80° C., run T=90° C., 0.004 C6/C2, 0.0011 H2/C2, 230 psi C2, 1 hour. Condition 2a: injection T=80° C., run T=100° C., 0.004 C6/C2, 0.0068 H2/C2, 230 psi C2, 1 hour. Condition 2b: injection T=80° C., run T=100° C., 0.004 C6/C2, 0.0016 H2/C2, 230 psi C2, 1 hour. Condition 3: injection T=80° C., run T=93° C., 0.0043 C6/C2, 0.004 H2/C2, 220 psi C2, 1 hour. *3 hours. Condition 4: injection T=80° C., run T=90° C., 0 C6/C2, 0.018 H2/C2, 230 psi C2, 1 hour. Condition 5: injection T=80° C., run T=90° C., 0 C6/C2, 0.01 H2/C2, 230 psi C2, 1 hour. Condition 6: injection T=80° C., run T=90° C., 0 C6/C2, 0.007 H2/C2, 230 psi C2, 1 hour. Condition 7: injection T=80° C., run T=90° C., 0 C6/C2, 0.004 H2/C2, 230 psi C2, 1 hour. Condition 8: injection T=80° C., run T=90° C., 0 C6/C2, 0.01 H2/C2, 165 psi C2, 1 hour. Condition 9: injection T=80° C., run T=90° C., 0 C6/C2, 0.01 H2/C2, 100 psi C2, 1 hour. Condition 10: injection T=80° C., run T=105° C., 0 C6/C2, 0.01 H2/C2, 230 psi C2, 1 hour. Condition 11: injection T=80° C., run T=80° C., 0 C6/C2, 0.01 H2/C2, 230 psi C2, 1 hour.

Another method to assess a catalyst's light-off and controlled ethylene consumption is to measure the time at which the catalyst has consumed a specific amount of the total ethylene consumed during an experiment. Catalysts which have rapid, uncontrollable light-offs and ethylene consumption leading to inoperable behavior tend to rapidly consume ethylene in a manner in which the majority of their total ethylene uptake occurs within the initial stages of the run (i.e. $1^{st}$ 6 minutes, or 10% of a 60 minute run). This behavior tends to lead to chunking and/or agglomeration in the reactor as well. Table 5 illustrates the specific time points at which the catalyst consumed 25%, 50%, 75%, and 90% of the total ethylene consumed during the run for each of the various conditions. At the reactor conditions under higher ethylene partial pressure (C2PP≥165 psi), the times at which Catalyst Systems 1 to 4 consume 25%, 50%, 75%, and 90% of the total ethylene consumed, during the 1 hour run, are significantly slower than that of the comparative examples, Comparative Catalyst Systems C1 and C2 (Table 5, No. 4-13, and 15-16 vs. 18, 19 and 21). Combined with the data in Table 4, the data in Table 5 indicates a slower initial ethylene consumption as well as a controlled ethylene consumption throughout the course of the run for each of the inventive Catalyst Systems 1 to 4, which is in stark contrast to the rapid, uncontrollable ethylene consumption throughout the course of the run for comparative example, Comparative Catalyst System 1, under conditions with high ethylene partial pressure.

TABLE 5

Time at which 25%, 50%, 75%, and 90% total ethylene uptake occurs for Catalyst System 1C and Catalyst System 2 and comparative examples.

| No. | Catalyst | Cond. | Time of 25% C2 Uptake (minutes) | Time of 50% C2 Uptake (minutes) | Time of 75% C2 Uptake (minutes) | Time of 90% C2 Uptake (minutes) |
|---|---|---|---|---|---|---|
| 1 | Cat. Sys 1 | 1a | 18.1 | 31.8 | 45.3 | 53.9 |
| 2 | Cat. Sys 2 | 1a | 18.1 | 33.6 | 47.1 | 54.4 |
| 3 | Cat. Sys 3 | 1a | 17.1 | 31.3 | 45.8 | 54.6 |
| 4 | Cat. Sys 1 | 2a | 13.5 | 27.3 | 42.3 | 52.5 |
| 5 | Cat. Sys 2 | 2a | 7.2 | 20.0 | 38.0 | 50.5 |
| 6 | Cat. Sys 1 | 3 | 12.9 | 26.6 | 43.1 | 52.9 |
| 7 | Cat. Sys 2 | 3 | 11.5 | 26.0 | 41.6 | 52.5 |
| 8 | Cat. Sys 3 | 3 | 15.4 | 29.2 | 43.2 | 52.9 |
| 9 | Cat. Sys 4 | 4 | 15.6 | 29.8 | 44.3 | 53.6 |
| 10 | Cat. Sys 4 | 5 | 15.5 | 29.5 | 44.2 | 53.5 |
| 11 | Cat. Sys 4 | 6 | 14.6 | 27.6 | 41.9 | 51.2 |
| 12 | Cat. Sys 4 | 7 | 14.8 | 28.3 | 43.1 | 52.8 |
| 13 | Cat. Sys 4 | 8 | 16.0 | 30.2 | 44.7 | 54.0 |
| 14 | Cat. Sys 4 | 9 | 17.0 | 32.0 | 46.4 | 54.8 |
| 15 | Cat. Sys 4 | 10 | 8.7 | 20.7 | 37.2 | 50.2 |
| 16 | Cat. Sys 4 | 11 | 17.4 | 31.9 | 45.9 | 54.4 |
| Comparative Examples | | | | | | |
| 17 | Comp. Cat C1 | 1b | 8.3 | 19.8 | 37.5 | 50.5 |
| 18 | Comp. Cat C1 | 2a | 1.6 | 4.8 | 18.8 | 44.3 |
| 19 | Comp. Cat C1 | 2b | 1.8 | 2.8 | 3.6 | 4.1 |
| 20 | Comp. Cat C2 | 3* | 3.7 | 17.0 | 60.7 | 121.5 |
| 21 | Comp. Cat C2 | 2a | 1.6 | 7.1 | 23.6 | 43.1 |

Condition 1a: injection T=80° C., run T=90° C., 0.003 C6/C2, 0.004 H2/C2, 100 psi C2, 1 hour run time. Condition 1b: injection T=80° C., run T=90° C., 0.004 C6/C2, 0.0011 H2/C2, 115 psi C2, 1 hour. Condition 2a: injection T=80° C., run T=100° C., 0.004 C6/C2, 0.0068 H2/C2, 230 psi C2, 1 hour. Condition 2b: injection T=80° C., run T=90° C., 0.004 C6/C2, 0.0011 H2/C2, 230 psi C2, 1 hour. Condition 2c: injection T=80° C., run T=100° C., 0.004 C6/C2, 0.0016 H2/C2, 230 psi C2, 1 hour. Condition 3: injection T=80° C., run T=93° C., 0.0043 C6/C2, 0.004 H2/C2, 220 psi C2, 1 hour. *3 hours. Condition 4: injection T=80° C., run T=90° C., 0 C6/C2, 0.018 H2/C2, 230 psi C2, 1 hour. Condition 5: injection T=80° C., run T=90° C., 0 C6/C2, 0.01 H2/C2, 230 psi C2, 1 hour. Condition 6: injection T=80° C., run T=90° C., 0 C6/C2, 0.007 H2/C2, 230 psi C2, 1 hour. Condition 7: injection T=80° C., run T=90° C., 0 C6/C2, 0.004 H2/C2, 230 psi C2, 1 hour. Condition 8: injection T=80° C., run T=90° C., 0 C6/C2, 0.01 H2/C2, 165 psi C2, 1 hour. Condition 9: injection T=80° C., run T=90° C., 0 C6/C2, 0.01 H2/C2, 100 psi C2, 1 hour. Condition 10: injection T=80° C., run T=105° C., 0 C6/C2, 0.01 H2/C2, 230 psi C2, 1 hour. Condition 11: injection T=80° C., run T=80° C., 0 C6/C2, 0.01 H2/C2, 230 psi C2, 1 hour.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 $g/cm^3$" is intended to mean "about 40 $g/cm^3$."

Notations used in the equations included herein refer to their standard meaning as understood in the field of mathematics. For example, "=" means equal to, "x" denotes the multiplication operation, "+" denotes the addition operation, "−" denotes the subtraction operation, ">" is a "greater than" sign, "<" is a "less than" sign, "and "/" denotes the division operation.

Every document cited herein, if any, including any cross-referenced or related patent or patent application and any patent or patent application to which this application claims priority or benefit thereof, is incorporated by reference in its entirety unless expressly excluded or otherwise limited. The citation of any document is not an admission that it is prior art with respect to any embodiment disclosed or claimed, or that it alone, or in any combination with any other reference or references, teaches, suggests, or discloses any such embodiment. Further, to the extent that any meaning or definition of a term in this document conflicts with any meaning or definition of the same term in a document incorporated by reference, the meaning or definition assigned to that term in this document shall govern.

The invention claimed is:

1. A process for producing polyethylene, the process comprising contacting ethylene and, optionally, one or more $(C_3\text{-}C_{12})\alpha$-olefin comonomers with a catalyst system in a gas-phase polymerization reactor at a reactor temperature of 70° C. to less than or equal to 150° C. with an ethylene partial pressure greater than or equal to 150 psi, and a molar feed ratio of less than or equal to 0.030 of one or more $(C_3\text{-}C_{12})\alpha$-olefin comonomers to ethylene using the catalyst system comprising a metal-ligand complex disposed on one or more support materials, wherein the metal-ligand complex has a structure according to formula (Ia):

(Ia)

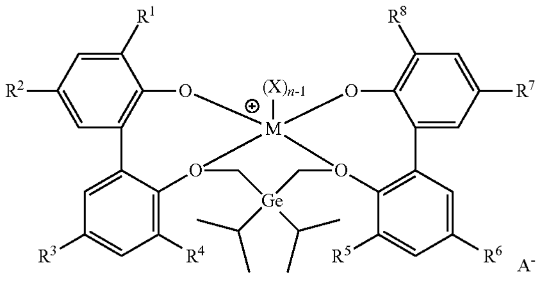

wherein:

$A^-$ is an anion;

M is titanium, zirconium, or hafnium;

n is 1, 2, or 3;

each X is a monodentate ligand independently selected from the group consisting of $(C_1\text{-}C_{50})$hydrocarbyl, $(C_1\text{-}C_{50})$heterohydrocarbyl, $(C_6\text{-}C_{50})$aryl, $(C_2\text{-}C_{50})$heteroaryl, and halogen;

$R^1$ and $R^8$ are independently selected from the group consisting of radicals having formula (II), and radicals having formula (III):

(II)

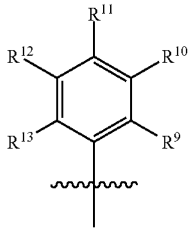

-continued (III)

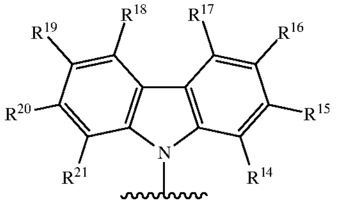

wherein $R^{9-13}$, and $R^{14-21}$ are independently chosen from —H, $(C_1\text{-}C_{50})$hydrocarbyl, $(C_1\text{-}C_{50})$heterohydrocarbyl, $—Si(R^C)_3$, $—Ge(R^C)_3$, $—P(R^P)_2$, $—N(R^N)_2$, $—OR^C$, $—SR^C$, and halogen;

$R^2$, $R^3$, $R^4$, $R^5$, $R^6$, and $R^7$ are independently chosen from —H, $(C_1\text{-}C_{50})$hydrocarbyl, $(C_1\text{-}C_{50})$heterohydrocarbyl, $—Si(R^C)_3$, $—Ge(R^C)_3$, $—P(R^P)_2$, $—N(R^N)_2$, $—OR^C$, $—SR^C$, and halogen; and an amount of ethylene consumed during the first 5 minutes upon injection of the catalyst system into the gas-phase polymerization reactor is less than 25% of the total ethylene consumed for the time of the entirety of the average residence time, $t_R$, upon initial addition of the catalyst system, wherein the time at which 25% of the total ethylene uptake ($t_{25\%}$) is calculated by the equation according to formula (IV):

$$\frac{\sum_{t=0}^{t_{25\%}} C2(t)}{\sum_{t=0}^{t_R} C2(t)} = 0.25, \text{ and } t_{25\%} > 5 \text{ min.} \quad \text{(IV)}$$

2. The process of claim 1, wherein the process further comprises an uptake ratio ($U_t$) at a specific time, t, during the entirety of the average residence time, $t_R$, can be calculated according to formula (V):

$$U_t = \frac{\sum_{t=0}^{t} C2(t)}{\sum_{t=0}^{t_R} C2(t)} \quad \text{(V)}$$

and $U_t$ of the catalyst system is less than or equal to 0.02 (2 percent) at the time point of 0.5 minutes (30 seconds) after the catalyst system is fed into the reactor as given by the formulae (X) and (XI):

$$\text{Uptake at 30 sec (0.5 min), } U_{0.5} = \frac{\sum_{t=0}^{0.5} C2(t)}{\sum_{t=0}^{t_R} C2(t)} \le 0.02 \quad \text{(X)}$$

$$\text{Uptake at 30 sec (0.5 min), } U_{0.5} = \int_0^{0.5} C2(t)dt \le 0.02 \quad \text{(XI)}$$

3. The process of claim 2, wherein the Ur of the catalyst system is less than or equal to 0.05 (5 percent) at the time point of 1.5 minutes (90 seconds) after the catalyst system is fed into the reactor, given by the expression:

$$U_{1.5} = \frac{\sum_{t=0}^{1.5} C2(t)}{\sum_{t=0}^{t_R} C2(t)} \le 0.05 \quad \text{(XIII)}$$

4. The process of claim 2, wherein the Ur of the catalyst system is less than or equal to 0.15 (15 percent) at the time point of 3.0 minutes (180 seconds) after the catalyst system is fed into the reactor, given by the expression:

$$U_{3.0} = \frac{\sum_{t=0}^{3.0} C2(t)}{\sum_{t=0}^{t_R} C2(t)} \le 0.15 \quad \text{(XIV)}$$

5. The process of claim 1, wherein the Ur of the catalyst system is less than or equal to 0.10 (10 percent) at the time point of 3.0 minutes (180 seconds) after the catalyst system is fed into the reactor, given by the expression:

$$U_{3.0} = \frac{\sum_{t=0}^{3.0} C2(t)}{\sum_{t=0}^{t_R} C2(t)} \le 0.10 \quad \text{(XIV)}$$

6. The process of claim 1, wherein the amount of ethylene consumed during the first 18 minutes upon injection of the catalyst system into the gas-phase polymerization reactor is less than 50% of the total ethylene consumed for the time of the entirety of the average residence time, $t_R$, upon initial addition of the catalyst system, wherein the time at which 50% of the total ethylene uptake ($t_{25\%}$) is calculated by the equation according to formula (IV):

$$\frac{\sum_{t=0}^{t_{50\%}} C2(t)}{\sum_{t=0}^{t_R} C2(t)} = 0.50, \text{ and } t_{25\%} > 20 \text{ min.} \quad \text{(XV)}$$

7. The process of claim 1, wherein the percent exotherm ($\%_{exo}$) is less than 10%, or wherein the percent exotherm ($\%_{Exo}$) is less than 5%.

8. The process of claim 1, wherein at least one of $R^1$ and $R^8$ is a radical having formula (II) and at least one of $R^{10}$ and $R^{12}$ is tert-butyl.

9. The process of claim 1, wherein at least one of $R^1$ and $R^8$ is a radical having formula (III) and at least one of $R^1$, $R^{16}$, $R^{19}$, and $R^{20}$ is tert-butyl.

10. The process of claim 1, wherein one or more support materials comprise fumed silica.

11. The process of claim 1, wherein the anion is an aluminate.

12. A method of preparing the catalyst system of claim 1, wherein the method comprises:

disposing one or more activators on the one or more support materials to produce a supported activator; and contacting the supported activator with a solution or slurry of the neutral metal-ligand complex in the inert hydrocarbon solvent.

13. The method of claim 12, wherein the one or more activators comprises methylalumoxane (MAO).

14. The method of claim 1, wherein the catalyst system is fed to the gas-phase polymerization reactor in neat form, as a solution, or as a slurry.

15. The process of claim 1, wherein the ethylene partial pressure in the reactor is greater or equal to 150 psi.

16. The process of claim 1, wherein the reactor temperature is greater than or equal to 70° C. and less than or equal to 120° C.

17. A process for producing polyethylene, the process comprising contacting ethylene and, optionally, one or more ($C_3$-$C_{12}$)α-olefin comonomers with a catalyst system in a gas-phase polymerization reactor at a reactor temperature of 70° C. to less than or equal to 150° C. with an ethylene partial pressure of 50 psi to 150 psi, and a molar feed ratio of less than or equal to 0.030 of one or more ($C_3$-$C_{12}$)α-olefin comonomers to ethylene using the catalyst system comprising a metal-ligand complex disposed on one or more support materials, wherein the metal-ligand complex has a structure according to formula (Ia):

(Ia)

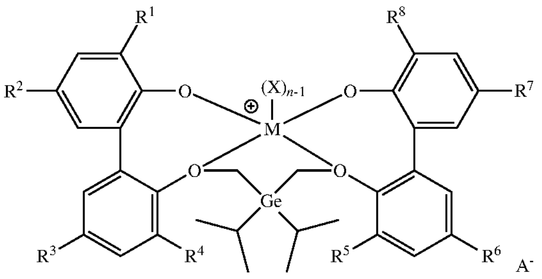

wherein:

$A^-$ is an anion;

M is titanium, zirconium, or hafnium;

n is 1, 2, or 3;

each X is a monodentate ligand independently selected from a group consisting of ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, and halogen;

$R^1$ and $R^8$ are independently selected from a group consisting of radicals having formula (II), and radicals having formula (III):

(II)

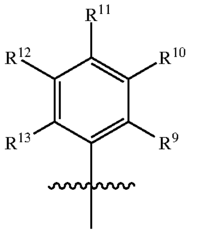

-continued (III)

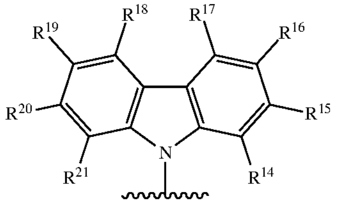

wherein $R^{9-13}$, and $R^{14-21}$ are independently chosen from —H, ($C_1$-$C_{50}$)hydrocarbyl, ($C_1$-$C_{50}$)heterohydrocarbyl, —$Si(R^C)_3$, —$Ge(R^C)_3$, —$P(R^P)_2$, —$N(R^N)_2$, —$OR^C$, —$SR^C$, and halogen;

$R^2$, $R^3$, $R^4$, $R^5$, $R^6$, and $R^7$ are independently chosen from —H, ($C_1$-$C_{50}$)hydrocarbyl, ($C_1$-$C_{50}$)heterohydrocarbyl, —$Si(R^C)_3$, —$Ge(R^C)_3$, —$P(R^P)_2$, —$N(R^N)_2$, —$OR^C$, —$SR^C$, and halogen; and an amount of ethylene consumed during the first 25 minutes upon injection of the catalyst system into the gas-phase polymerization reactor is less than 50% of the total ethylene consumed for the time of the entirety of the average residence time, $t_R$, upon initial addition of the catalyst system, wherein the time at which 25% of the total ethylene uptake ($t_{25\%}$) is calculated by the equation according to formula (IV):

$$\frac{\sum_{t=0}^{t_{25\%}} C2(t)}{\sum_{t=0}^{t_R} C2(t)} = 0.25, \text{ and } t_{25\%} > 5 \text{ min.} \quad \text{(IV)}$$

18. The process of claim 17, wherein the ethylene partial pressure is from 80 psi to 115 psi, or from 90 psi to 130 psi, or from 100 to 150 psi.

19. The process of claim 17, wherein the amount of ethylene consumed during the first 30 minutes upon initial injection of the catalyst system into the gas-phase polymerization reactor is less than 50% of the total ethylene consumed for the time of the entirety of the average residence time.

20. The process of claim 17, wherein the percent exotherm ($\%_{exo}$) is less than 5%, or wherein the percent exotherm ($\%_{Exo}$) is less than 2%.

* * * * *